US012761861B2

(12) United States Patent
Lee et al.

(10) Patent No.: US 12,761,861 B2
(45) Date of Patent: Oct. 13, 2026

(54) DISPLAY DEVICE AND OPERATING METHOD THEREFOR

(71) Applicant: Samsung Electronics Co., Ltd., Suwon-si (KR)

(72) Inventors: Jongin Lee, Suwon-si (KR); Sehyun Kim, Suwon-si (KR); Sukun Yoon, Suwon-si (KR); Hyeeun Park, Suwon-si (KR); Kilsoo Choi, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 26 days.

(21) Appl. No.: 18/642,118

(22) Filed: Apr. 22, 2024

(65) Prior Publication Data

US 2024/0272866 A1 Aug. 15, 2024

Related U.S. Application Data

(63) Continuation of application No. PCT/KR2022/016154, filed on Oct. 21, 2022.

(30) Foreign Application Priority Data

Oct. 22, 2021 (KR) ........................ 10-2021-0141936

(51) Int. Cl.
*G06F 3/16* (2006.01)
*G06F 3/0482* (2013.01)
*H04R 29/00* (2006.01)

(52) U.S. Cl.
CPC ............ *G06F 3/162* (2013.01); *G06F 3/0482* (2013.01); *H04R 29/005* (2013.01); *H04R 2420/07* (2013.01); *H04R 2499/15* (2013.01)

(58) Field of Classification Search
CPC ........................................................ G06F 3/162
See application file for complete search history.

(56) References Cited

U.S. PATENT DOCUMENTS

| | | | | |
|---|---|---|---|---|
| 9,980,059 | B2 | 5/2018 | Gehring et al. | |
| 10,140,086 | B2 | 11/2018 | Hong | |
| 2009/0061769 | A1 * | 3/2009 | Zimbric ............ | H04M 1/72412 455/41.2 |

(Continued)

FOREIGN PATENT DOCUMENTS

| | | | |
|---|---|---|---|
| CN | 110010139 | A | 7/2019 |
| CN | 110662204 | A | 1/2020 |

(Continued)

OTHER PUBLICATIONS

International Search Report for PCT/KR2022/016154 mailed Jan. 31, 2023, 5 pages.

(Continued)

*Primary Examiner* — Olisa Anwah
(74) *Attorney, Agent, or Firm* — Nixon & Vanderhye, P.C.

(57) ABSTRACT

An example display apparatus may include a display, a communication interface, a memory storing one or more instructions, and a processor configured to execute the one or more instructions stored in the memory to receive a voice call request; in response to receiving the voice call request, determine whether audio data is being transmitted to an audio input/output apparatus by the communication interface according to a Bluetooth communication protocol and, in response to determining that the audio data is being transmitted by the communication interface, identify one or more audio input apparatuses other than the audio input/output apparatus, select a first audio input apparatus from among the one or more identified audio input apparatuses, and activate the selected first audio input apparatus, and control a speech input according to the voice call request so (Continued)

as to be received from the activated first audio input apparatus.

16 Claims, 13 Drawing Sheets

(56) References Cited

U.S. PATENT DOCUMENTS

| | | | | |
|---|---|---|---|---|
| 2016/0360332 | A1* | 12/2016 | Shin | H04M 1/60 |
| 2017/0280261 | A1 | 9/2017 | Kobayashi | |
| 2017/0347192 | A1 | 11/2017 | Seo et al. | |
| 2020/0162205 | A1* | 5/2020 | Han | H04W 52/48 |
| 2021/0136839 | A1* | 5/2021 | Wang | G01J 5/0011 |
| 2022/0103607 | A1* | 3/2022 | Young | H04L 65/61 |
| 2023/0137607 | A1* | 5/2023 | Haartsen | H04L 65/80 |
| | | | | 455/41.2 |

FOREIGN PATENT DOCUMENTS

| | | | |
|---|---|---|---|
| CN | 111491278 | A | 8/2020 |
| JP | 2006254148 | A | 9/2006 |
| JP | 2016090824 | A | 5/2016 |
| KR | 20030046910 | A | 6/2003 |
| KR | 200465906 | Y1 | 3/2013 |
| KR | 101366313 | B1 | 2/2014 |
| KR | 20160143148 | A | 12/2016 |
| KR | 20170043319 | A | 4/2017 |
| KR | 101820369 | B1 | 1/2018 |
| KR | 20180082757 | A | 7/2018 |

OTHER PUBLICATIONS

Office Action dated May 19, 2026 in Korean Patent Application No. 10-2021-0141936 with English translation.

* cited by examiner

FIG. 5

AUDIO INPUT APPARATUS LIST — 500

| AUDIO INPUT APPARATUS |
| --- |
| CONFIRM THAT THIS ITEM SHOULD BE IN LIST OR SHOULD BE A HEADER |
| DISPLAY APPARATUS BUILT-IN MICROPHONE |
| USB-CONNECTED EXTERNAL MICROPHONE |
| DISPLAY APPARATUS-CONNECTED WEBCAM MICROPHONE |
| MICROPHONE OF DISPLAY APPARATUS REMOTE CONTROLLER |
| MICROPHONE OF DISPLAY APPARATUS-CONNECTED SMART DEVICE |

FIG. 6

AUDIO INPUT APPARATUS LIST — 600

| PRIORITY | AUDIO INPUT APPARATUS |
|---|---|
| 1 | DISPLAY APPARATUS BUILT-IN MICROPHONE |
| 2 | USB-CONNECTED EXTERNAL MICROPHONE |
| 3 | DISPLAY APPARATUS-CONNECTED WEBCAM MICROPHONE |
| 4 | MICROPHONE OF DISPLAY APPARATUS REMOTE CONTROLLER |
| 5 | MICROPHONE OF DISPLAY APPARATUS-CONNECTED SMART DEVICE |

DISPLAY DEVICE AND OPERATING METHOD THEREFOR

CROSS-REFERENCE TO RELATED APPLICATIONS

This application is a continuation of International Application No. PCT/KR2022/016154 designating the United States, filed on Oct. 21, 2022, in the Korean Intellectual Property Receiving Office and claiming priority to Korean Patent Application No. 10-2021-0141936, filed on Oct. 22, 2021, in the Korean Intellectual Property Office, the disclosures of each of which are incorporated by reference herein in their entireties.

BACKGROUND

Field

The disclosure relates to a display apparatus and an operating method thereof, and, for example, to a display apparatus for effectively processing audio input/output through the display apparatus, and to an operating method of the display apparatus.

Description of Related Art

As display apparatuses such as televisions have larger screens and have become smarter, there is a trend where users not only watch broadcast programs through display apparatuses but also play game content or consume content using various applications.

Various audio input/output apparatuses may be connected to a display apparatus using various communication technologies. Users may use display apparatuses by using various audio input/output apparatuses such as a Bluetooth headset, a universal serial bus (USB)-connected microphone, and a Bluetooth speaker. When an additional audio input operation is required while a user uses a display apparatus using audio input/output apparatuses connected through communication with the display apparatus, there is a need to provide an audio input/output function by adaptively selecting an audio input/output apparatus according to a situation or environment in which the user uses the display apparatus.

SUMMARY

Various embodiments provide a display apparatus and a method thereof, in which, when an additional audio input function is required while an audio input/output apparatus connected through communication is used, an audio input/output function may be provided by adaptively selecting an audio input/output apparatus according to a situation or environment in which a user uses the display apparatus.

According to an embodiment, a display apparatus may include a display, a communication interface (including e.g., communication circuitry), a memory storing one or more instructions, and a processor configured to execute the one or more instructions stored in the memory. According to an embodiment, the processor may be configured to execute the one or more instructions to receive a voice call request; in response to receiving the voice call request, determine whether audio data is being transmitted to an audio input/output apparatus by the communication interface according to a Bluetooth communication protocol; and, in response to determining that the audio data is being transmitted by the communication interface, identify one or more audio input apparatuses excluding the audio input/output apparatus, select a first audio input apparatus from among the one or more identified audio input apparatuses, and activate the selected first audio input apparatus, and control a speech input according to the voice call request so as to be received from the activated first audio input apparatus.

According to an embodiment, the processor may be configured to execute the one or more instructions to, in response to determining that the audio data is not being transmitted by the communication interface, select the audio input/output apparatus as an audio input apparatus for receiving a speech input according to the voice call request.

According to an embodiment, the processor may be configured to execute the one or more instructions to obtain an audio input apparatus list in which priorities are assigned to the one or more audio input apparatuses, and select, as the first audio input apparatus, an audio input apparatus with a highest priority in the audio input apparatus list.

According to an embodiment, the processor may be configured to execute the one or more instructions to determine the priorities, based on an apparatus characteristic of each of the one or more audio input apparatuses included in the audio input apparatus list.

According to an embodiment, the processor may be configured to execute the one or more instructions to test performance of each of the one or more audio input apparatuses included in the audio input apparatus list, and based on a result of the test, determine the priorities.

According to an embodiment, the processor may be configured to execute the one or more instructions to periodically test the performance of each of the audio input apparatuses included in the audio input apparatus list, and based on a result of the test, periodically update the priorities.

According to an embodiment, the processor may be configured to execute the one or more instructions to provide a graphical user interface for setting the priorities of the one or more audio input apparatuses included in the audio input apparatus list, and determine the priorities, based on user input received through the graphical user interface.

According to an embodiment, the processor may be configured to execute the one or more instructions to identify one or more audio input apparatuses registered in the display apparatus, test performance of each of the one or more identified audio input apparatuses in real time, and based on a result of the test, select the first audio input apparatus.

According to an embodiment, the one or more audio input apparatuses may include at least one of a display apparatus built-in microphone, a microphone included in an external apparatus connected to the display apparatus, a microphone included in a remote control apparatus configured to control the display apparatus, or a microphone included in a smart device connected to the display apparatus.

According to an embodiment, the processor may be configured to execute the one or more instructions to determine whether the audio data is being transmitted to the audio input/output apparatus by the communication interface by identifying whether the communication interface operates according to a Bluetooth advanced audio distribution profile (A2DP) profile.

According to an embodiment, an operating method of a display apparatus may include receiving a voice call request; in response to receiving the voice call request, determining whether audio data is being transmitted to an audio input/output apparatus by a communication interface according to a Bluetooth communication protocol; and, in response to determining that the audio data is being transmitted by the communication interface, identifying one or more audio input apparatuses excluding the audio input/output apparatus, selecting a first audio input apparatus from among the one or more identified audio input apparatuses, activating the selected first audio input apparatus, and controlling a speech input according to the voice call request so as to be received from the activated first audio input apparatus.

According to an embodiment, a computer-readable recording medium may have recorded thereon one or more programs which, when executed by a processor of a display apparatus, perform operations including receiving a voice call request, in response to receiving the voice call request; determining whether audio data is being transmitted to an audio input/output apparatus by a communication interface according to a Bluetooth communication protocol; and, in response to determining that the audio data is being transmitted by the communication interface, identifying one or more audio input apparatuses excluding the audio input/output apparatus, selecting a first audio input apparatus from among the one or more identified audio input apparatuses, and activating the selected first audio input apparatus, and controlling a speech input according to the voice call request so as to be received from the activated first audio input apparatus.

According to various embodiments of the present disclosure, in a situation in which a display apparatus needs to provide a voice call function together with outputting audio corresponding to content, the voice call function may be provided without deteriorating the quality of audio data by selecting an audio input apparatus such that an audio output path is separated from an audio input path.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 5 shows an example audio input apparatus list according to various embodiments;

FIG. 6 shows an example audio input apparatus list according to various embodiments;

DETAILED DESCRIPTION

Figure 1:
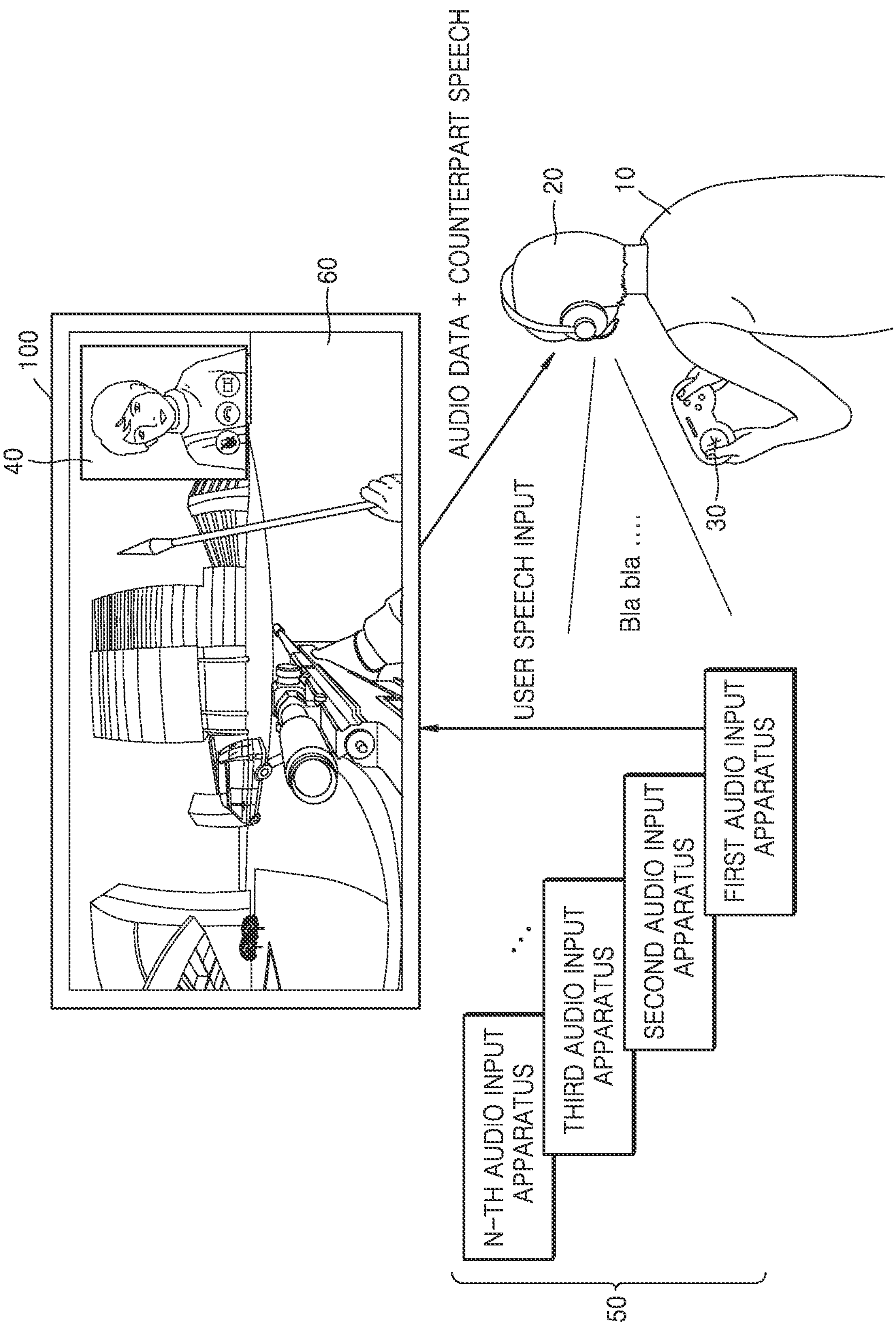
FIG. 1 is a reference diagram for describing an example of performing an audio input/output operation using an audio input/output apparatus connected through communication in a display apparatus such as a television (TV)

Some terms used in the present disclosure will be briefly defined, and the present disclosure will be described in detail.

The terms used in the present disclosure are those general terms currently widely used in the art in consideration of functions in regard to the present disclosure, but the terms may vary according to the intention of those of ordinary skill in the art, precedents, or new technologies in the art. Also, some terms may be arbitrarily selected by the applicant, and, in this case, the meaning of the selected terms will be described in detail in the detailed description of the disclosure. Thus, the terms used in the present disclosure should be understood not as simple names but based on the meaning of the terms and the overall description of the disclosure.

Throughout the specification, when a portion "includes" a component, another component may be further included, rather than excluding the existence of the other component, unless otherwise described. In addition, terms such as "... or/er", "... module", or the like refer to units that perform at least one function or operation, and the units may be implemented as hardware or software or as a combination of hardware and software.

Hereinafter, non-limiting, example embodiments of the disclosure will be described in detail with reference to the accompanying drawings such that one of ordinary skill in the art may easily implement the disclosure. The present disclosure may, however, be embodied in many different forms and should not be construed as limited to the embodiments of the disclosure set forth herein. In addition, components not related to description are omitted in the drawings for clear description of the present disclosure, and like reference numerals in the drawings denote like components throughout the specification.

As used in the embodiments of the present specification, the term "user" may refer to a person who controls a function or operation of a computing apparatus or electronic apparatus by using a control apparatus, and may include a viewer, a manager, or an installation engineer.

FIG. 1 is a reference diagram for describing an example of performing an audio input/output operation using an audio input/output apparatus connected through communication in a display apparatus such as a television (TV).

Referring to FIG. 1, a display apparatus 100 may display various types of image content on a display. Various types of image content may include, for example, a broadcast program, a movie, game content, an application execution screen, etc. FIG. 1 shows an example in which the display apparatus 100 displays game content 60. The display apparatus 100 may output, to a Bluetooth headset 20 connected to the display apparatus 100, audio content corresponding to the displayed game content 60. Also, a user 10 may input, using a game controller 30, a command to control the game content 60 displayed on the display apparatus 100.

In addition, while the user uses the display apparatus 100, the user may make a voice call or video call using the display apparatus 100. For example, the user may make a voice call or video call by executing a voice call service application or a video call application installed on the display apparatus 100. In the case of a video call, the display apparatus 100 may output speech of a video call counterpart 40 to the Bluetooth headset 20 and receive speech of the user 10 from the Bluetooth headset 20, which includes a microphone.

As shown in FIG. 1, in a situation in which the user executes game content through the display apparatus 100 and the display apparatus 100 outputs, to the Bluetooth headset 20, audio data corresponding to the game content, when a voice call request is received from the user, the display apparatus 100 may provide a voice call service through the already connected Bluetooth headset 20. That is, a counterpart speech input received from a voice call counterpart apparatus may be output to the Bluetooth headset 20, and a speech input of the user 10 received from the Bluetooth headset 20 may be transmitted to the voice call counterpart apparatus.

As described above, the display apparatus 100 may further provide a voice call function using the already connected Bluetooth headset 20. However, when the display apparatus 100 operates as described above, the quality of the audio data corresponding to the game content output to the Bluetooth headset 20 may deteriorate. When the audio data corresponding to the game content is transmitted to the Bluetooth headset 20, data transmission is performed based on an advanced audio distribution profile (A2DP) profile, which is a Bluetooth profile exclusively for one-way audio stream transmission, and the quality of the audio data may be ensured. However, in order to provide the voice call function, the A2DP needs to be changed to a hands-free profile (HFP) Bluetooth profile exclusively for two-way data communication between the display apparatus 100 and the Bluetooth headset 20, and, when data transmission is performed based on the HFP Bluetooth profile, the quality of the audio data corresponding to the game content, transmitted from the display apparatus 100 to the Bluetooth headset 20, is likely to deteriorate.

Accordingly, in the example embodiments of the present disclosure, in order to address such a problem, when an audio input function is required while the audio data is output to the Bluetooth headset 20, the display apparatus 100 may provide a separate audio input path independent of an audio output path through the already connected Bluetooth headset 20. That is, the display apparatus 100 uses the already connected Bluetooth headset 20 only for audio data output, and, in order to receive a speech input for the voice call function through a separate audio input apparatus, the display apparatus 100 may select an audio input apparatus for speech input of a user. The display apparatus 100 may identify one or more audio input apparatuses 50, that is, a first audio input apparatus, a second audio input apparatus, a third audio input apparatus, . . . , and an N-th audio input apparatus, and may select one of the audio input apparatuses. The one or more audio input apparatuses may include an audio input apparatus built into the display apparatus 100, an audio input apparatus connected to the display apparatus 100 by wire, and an audio input apparatus wirelessly connected to the display apparatus 100. The audio input apparatus may include at least one of a display apparatus built-in microphone, a microphone included in an external apparatus connected to the display apparatus, a microphone included in a remote control apparatus configured to control the display apparatus, and a microphone included in a smart device connected to the display apparatus.

As described above, the display apparatus 100 may prevent or reduce deterioration in the quality of output audio data while providing the voice call function to the user, by separating the audio output path from the audio input path.

According to an embodiment, the display apparatus 100 may, in response to receiving a voice call request, determine whether audio data is being transmitted to the audio input/output apparatus according to a Bluetooth communication protocol; in response to determining that the audio data is being transmitted, identify one or more audio input apparatuses excluding the audio input/output apparatus; select a first audio input apparatus from among the one or more identified audio input apparatuses, and activate the selected first audio input apparatus; and control a speech input according to the voice call request so as to be received from the activated first audio input apparatus.

According to an embodiment, in response to determining that the audio data is not being transmitted to the audio input/output apparatus by a communication interface, the display apparatus 100 may select the audio input/output apparatus as an audio input apparatus for receiving a speech input according to the voice call request.

According to an embodiment, the display apparatus 100 may obtain an audio input apparatus list including one or more audio input apparatuses. Priorities may be assigned to the one or more audio input apparatuses included in the audio input apparatus list. The display apparatus 100 may select, as the first audio input apparatus, an audio input apparatus with a highest priority in the audio input apparatus list.

According to an embodiment, the display apparatus 100 may determine a priority of each audio input apparatus based on apparatus characteristics of each of the one or more audio input apparatuses included in the audio input apparatus list.

According to an embodiment, the display apparatus 100 may test performance of each of the one or more audio input apparatuses included in the audio input apparatus list, and, based on a result of the test, determine a priority of each audio input apparatus.

According to an embodiment, the display apparatus 100 may periodically test the performance of each of the one or more audio input apparatuses included in the audio input apparatus list, and, based on a result of the test, periodically update the priority of each audio input apparatus.

According to an embodiment, the display apparatus 100 may provide a graphical user interface for setting priorities of the one or more audio input apparatuses included in the audio input apparatus list and determine a priority of each audio input apparatus based on a user input received through the graphical user interface.

According to an embodiment, the display apparatus 100 may identify the one or more audio input apparatuses registered in the display apparatus, test performance of each of the one or more identified audio input apparatuses in real time, and, based on a result of the test, select the first audio input apparatus.

According to an embodiment, the display apparatus 100 may determine whether the audio data is being transmitted to the audio input/output apparatus by the communication interface, by identifying whether the communication interface operates according to a Bluetooth A2DP profile.

According to an embodiment, the display apparatus 100 may, in response to receiving a speech input request, determine whether audio data is being transmitted to the audio input/output apparatus according to a Bluetooth communication protocol; in response to determining that the audio data is being transmitted, identify a type of application that has received the speech input request; identify one or more audio input apparatuses based on the identified type of application; select the first audio input apparatus from among the one or more identified audio input apparatuses, and activate the selected first audio input apparatus; and control a speech input to be received from the activated first audio input apparatus.

Figure 2:
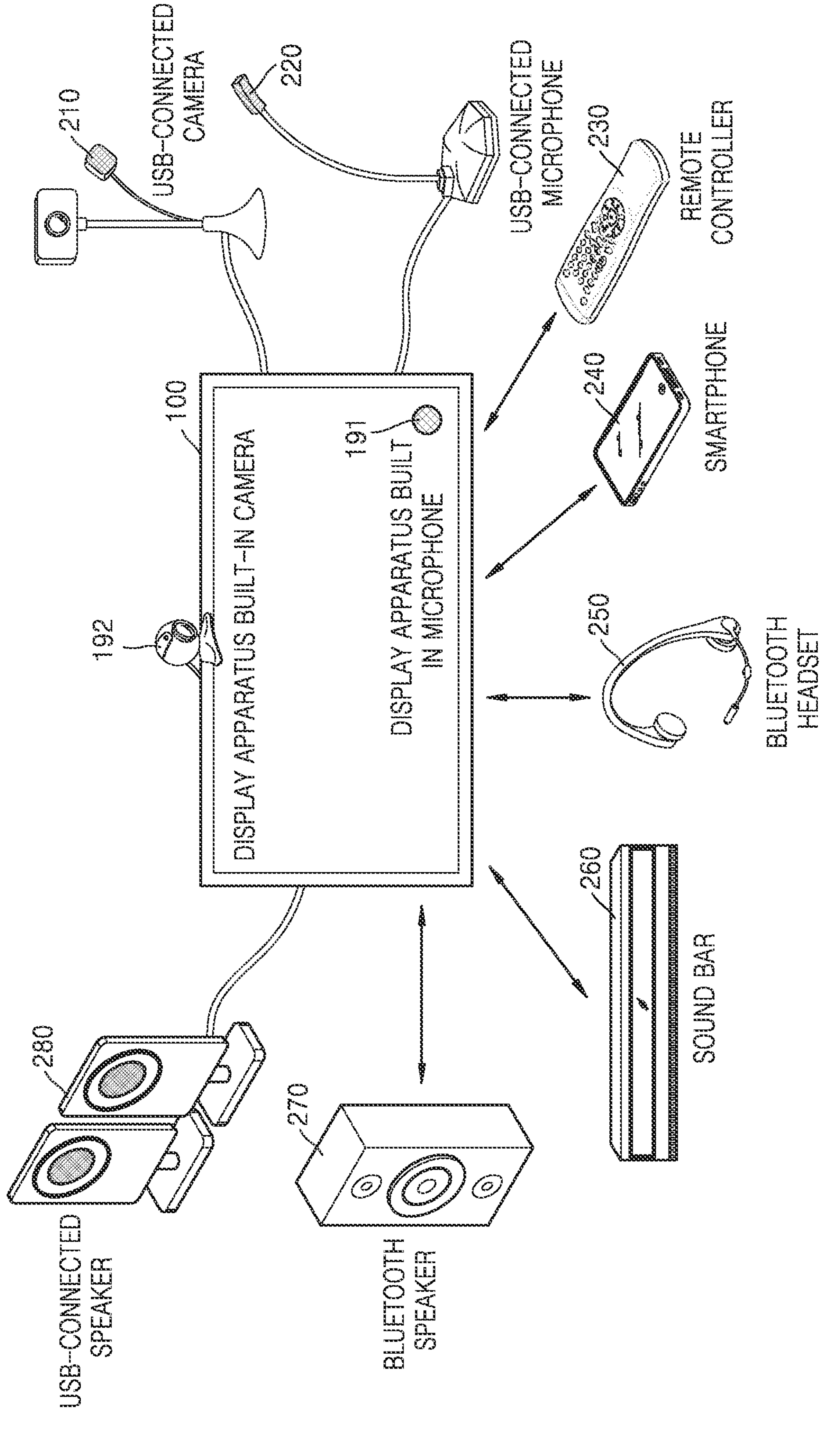
FIG. 2 is a reference diagram for examples of various audio input/output apparatuses that may be connected to a display apparatus, according to various embodiments.

FIG. 2 is a reference diagram for describing examples of various audio input/output apparatuses that may be connected to a display apparatus, according to various embodiments.

Referring to FIG. 2, according to an embodiment, the display apparatus 100 may include at least one of a display apparatus built-in microphone 191 and a display apparatus built-in camera 192. The display apparatus built-in camera 192 may include a microphone.

Also, the display apparatus 100 may be connected to various audio input/output apparatuses using various communication protocols.

According to an embodiment, the display apparatus 100 may be connected to a universal serial bus (USB)-connected camera 210, which uses a USB communication protocol for communication connection, and may receive an image obtained by the USB-connected camera 210. The USB-connected camera 210 may include a microphone or a speaker.

According to an embodiment, the display apparatus 100 may be connected to a USB-connected microphone 220, which uses a USB communication protocol for communication connection, and may receive speech data obtained by the USB-connected microphone 220. The USB-connected microphone 220 may include a speaker.

According to an embodiment, the display apparatus 100 may receive speech from a remote controller 230 including a microphone.

According to an embodiment, the display apparatus 100 may be connected to a smartphone 240, which uses a wireless fidelity (Wi-Fi) communication protocol or Bluetooth communication protocol for communication connection, and may receive speech data or image data obtained by the smartphone 240.

According to an embodiment, the display apparatus 100 may be connected to a Bluetooth headset 250, which uses a Bluetooth communication protocol for communication connection, and may output speech or audio data to the Bluetooth headset or receive speech data obtained by the Bluetooth headset 250.

According to an embodiment, the display apparatus 100 may be connected to a sound bar 260, which uses a Bluetooth communication protocol for communication connection, and may output speech or audio data to the sound bar 260.

According to an embodiment, the display apparatus 100 may be connected to a Bluetooth speaker 270, which uses a Bluetooth communication protocol for communication connection, and may output speech or audio data to the Bluetooth speaker 270.

According to an embodiment, the display apparatus 100 may be connected to a USB-connected speaker 280, which uses a USB communication protocol for communication connection, and may output speech or audio data to the USB-connected speaker 280.

According to an embodiment, as shown in FIG. 2, the display apparatus 100 may store a list of built-in audio input/output apparatuses or audio input/output apparatuses that are connectable through communication. The list of audio input/output apparatuses may include an audio input apparatus list and an audio output apparatus list. In the audio input apparatus list, priorities may be assigned to a plurality of audio input apparatuses. According to an embodiment, the priorities of the plurality of audio input apparatuses included in the audio input apparatus list may be determined based on apparatus characteristics. According to an embodiment, the priorities of the plurality of audio input apparatuses included in the audio input apparatus list may be determined based on a performance test result. According to an embodiment, the priorities of the plurality of audio input apparatuses included in the audio input apparatus list may be determined based on a user input. According to an embodiment, the priorities of the plurality of audio input apparatuses included in the audio input apparatus list may be periodically updated. In the audio output apparatus list, priorities may be assigned to a plurality of audio output apparatuses. According to an embodiment, the priorities of the plurality of audio output apparatuses included in the audio output apparatus list may be determined based on apparatus characteristics. According to an embodiment, the priorities of the plurality of audio output apparatuses included in the audio output apparatus list may be determined based on a performance test result. According to an embodiment, the priorities of the plurality of audio output apparatuses included in the audio output apparatus list may be determined based on a user input. According to an embodiment, the priorities of the plurality of audio output apparatuses included in the audio output apparatus list may be periodically updated.

Figure 3:
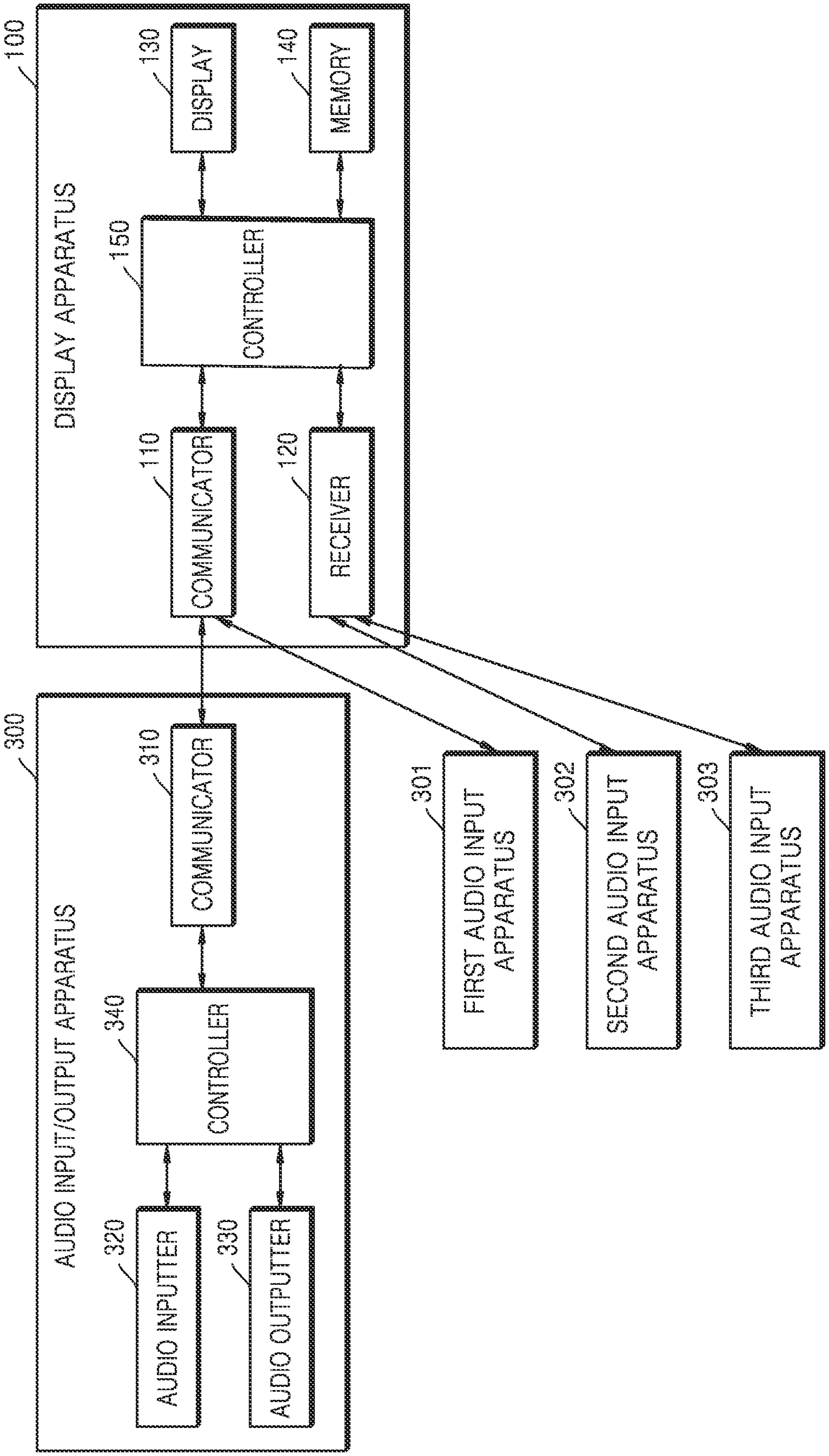
FIG. 3 is a schematic block diagram of an example display apparatus, according to various embodiments.

FIG. 3 is a schematic block diagram of an example display apparatus, according to various embodiments.

Referring to FIG. 3, the display apparatus 100 and an audio input/output apparatus 300 may transmit or receive audio data to or from each other using a wireless communication protocol.

The audio input/output apparatus 300 may include a communicator 310 (including, e.g., communication circuitry), an audio inputter 320 (including, e.g., audio input circuitry), an audio outputter 330 (including, e.g., audio output circuitry), and a controller 340 (including, e.g., a processing circuitry and/or controller circuitry).

The communicator 310 may receive audio data or transmit audio data by communicating with a communicator 110 (including, e.g., communication circuitry) of the display apparatus 100. For example, when game content is played on the display apparatus 100, the communicator 310 may receive audio data corresponding to the game content. For example, when a voice call application is running while the game content is played on the display apparatus 100, the communicator 310 may receive, from the display apparatus 100, audio data corresponding to the game content and speech data associated with a voice call.

The communicator 310 may include, for example, a Bluetooth communication module and may perform communication according to a Bluetooth communication profile. When an audio output activation request is received from the display apparatus 100, the communicator 310 may set the Bluetooth communication profile to an A2DP profile and transmit, to the display apparatus 100, a response signal indicating that the A2DP profile has been set. When a speech input activation request is received from the display apparatus 100, the communicator 310 may set the Bluetooth communication profile to an HFP profile and transmit, to the display apparatus 100, a response signal indicating that the HFP profile has been set.

The audio inputter 320 may receive speech from a user and transmit the speech to the communicator 310 through the controller 340. The audio inputter 320 may include, for example, a microphone.

The audio outputter 330 may output audio data or speech data received from the display apparatus 100. The audio outputter 330 may include, for example, a speaker.

The controller 340 may generally control the components of the audio input/output apparatus 300.

A first audio input apparatus 301, a second audio input apparatus 302, and a third audio input apparatus 303 are apparatuses that receive an input of audio data, and may transmit the input audio data to the display apparatus 100. The audio data may include, for example, speech data.

The first audio input apparatus 301 may be connected to the communicator 110 of the display apparatus 100 according to the wireless communication protocol. The first audio input apparatus 301 may communicate according to, for example, a Bluetooth communication protocol or a Wi-Fi communication protocol and may include, for example, the remote controller 230 or the smartphone 240, which includes a microphone.

The second audio input apparatus 302 and the third audio input apparatus 303 may be connected to a receiver 120 of the display apparatus 100 according to a wired communication protocol. The second audio input apparatus 302 and the third audio input apparatus 303 may include, for example, the USB-connected microphone 220 configured to communicate according to a USB communication protocol, and the USB-connected camera 210 including a microphone.

The display apparatus 100 may include the communicator 110, the receiver 120, a display 130, a memory 140, and a controller 150 (including, e.g., processing circuitry and/or controller circuitry).

The display apparatus 100 may refer to, for example, an apparatus that includes a display and may display image content, video content, game content, graphic content, etc. The display apparatus 100 may output or display an image or content received from an external input apparatus or a server computer. The display apparatus 100 may include various types of electronic apparatuses configured to receive and output content, such as a network TV, a smart TV, an Internet TV, a web TV, an Internet protocol TV (IPTV), and a personal computer (PC). The display apparatus 100 may be referred to as a display apparatus in that the display apparatus 100 receives and displays content, and may also be referred to as a content reception apparatus, an electronic apparatus, a computing apparatus, or the like.

The communicator 110 may include one or more modules configured to enable wireless communication between the display apparatus 100 and a wireless communication system or between the display apparatus 100 and a network where another electronic apparatus is located. FIG. 3 shows that the communicator 110 may be connected through communication with, for example, the audio input/output apparatus 300 and the first audio input apparatus 301.

According to an embodiment, the communicator 110 may include a Bluetooth communication module configured to perform communication according to the Bluetooth communication protocol. The Bluetooth communication module may transmit or receive data to or from the Bluetooth communication module of the audio input/output apparatus 300 according to the Bluetooth communication protocol.

The receiver 120 may include one or more ports and connect the display apparatus 100 to an external apparatus by wire. FIG. 3 shows that the receiver 120 may be connected to, for example, the second audio input apparatus 302 and the third audio input apparatus 303.

The display 130 may display content received from a server computer, content stored in the memory 140, and content processed by the controller 150. For example, the display 130 may display game content, video content, or various application execution screens.

The memory 140 may store programs associated with the operation of the display apparatus 100 and various types of data generated during the operation of the display apparatus 100.

The controller 150 may execute one or more instructions stored in the memory 140 to control overall operations of the display apparatus 100.

According to an embodiment, the controller 150 may be configured to execute the one or more instructions to, in response to receiving a voice call request, determine whether audio data is being transmitted to the audio input/output apparatus according to the Bluetooth communication protocol; in response to determining that the audio data is being transmitted, identify one or more audio input apparatuses excluding the audio input/output apparatus; select a first audio input apparatus from among the one or more identified audio input apparatuses, and activate the selected first audio input apparatus; and control a speech input according to the voice call request so as to be received from the activated first audio input apparatus.

According to an embodiment, the controller 150 may be configured to execute the one or more instructions to, in response to determining that the audio data is not being transmitted by the communication interface, select the audio input/output apparatus as an audio input apparatus for receiving a speech input according to the voice call request.

According to an embodiment, the controller 150 may be configured to execute the one or more instructions to obtain an audio input apparatus list including one or more audio input apparatuses. Priorities may be assigned to the one or more audio input apparatuses included in the audio input apparatus list. The display apparatus 100 may select, as the first audio input apparatus, an audio input apparatus with a highest priority in the audio input apparatus list.

According to an embodiment, the controller 150 may be configured to execute the one or more instructions to determine a priority of each audio input apparatus based on apparatus characteristics of each of the one or more audio input apparatuses included in the audio input apparatus list.

According to an embodiment, the controller 150 may be configured to execute the one or more instructions to test performance of each of the one or more audio input apparatuses included in the audio input apparatus list, and, based on a result of the test, determine a priority of each audio input apparatus.

According to an embodiment, the controller 150 may be configured to execute the one or more instructions to periodically test the performance of each of the one or more audio input apparatuses included in the audio input apparatus list, and, based on a result of the test, periodically update the priority of each audio input apparatus.

According to an embodiment, the controller 150 may be configured to execute the one or more instructions to provide a graphical user interface for setting priorities of the one or more audio input apparatuses included in the audio input apparatus list, and determine a priority of each audio input apparatus based on a user input received through the graphical user interface.

According to an embodiment, the controller 150 may be configured to execute the one or more instructions to identify the one or more audio input apparatuses registered in the display apparatus; test performance of each of the one or more identified audio input apparatuses in real time; and, based on a result of the test, select the first audio input apparatus.

According to an embodiment, the controller 150 may be configured to execute the one or more instructions to determine whether audio data is being transmitted to the audio input/output apparatus by the communication interface, by identifying whether the communication interface operates according to the Bluetooth A2DP profile.

According to an embodiment, the controller 150 may be configured to execute the one or more instructions to, in response to receiving a speech input request, determine whether audio data is being transmitted to the audio input/output apparatus according to the Bluetooth communication protocol; and in response to determining that the audio data is being transmitted, identify a type of application that has received the speech input request, identify one or more audio input apparatuses based on the identified type of application, select a first audio input apparatus from among the one or more identified audio input apparatuses, and activate the selected first audio input apparatus, and control a speech input to be received from the activated first audio input apparatus.

Figure 4:
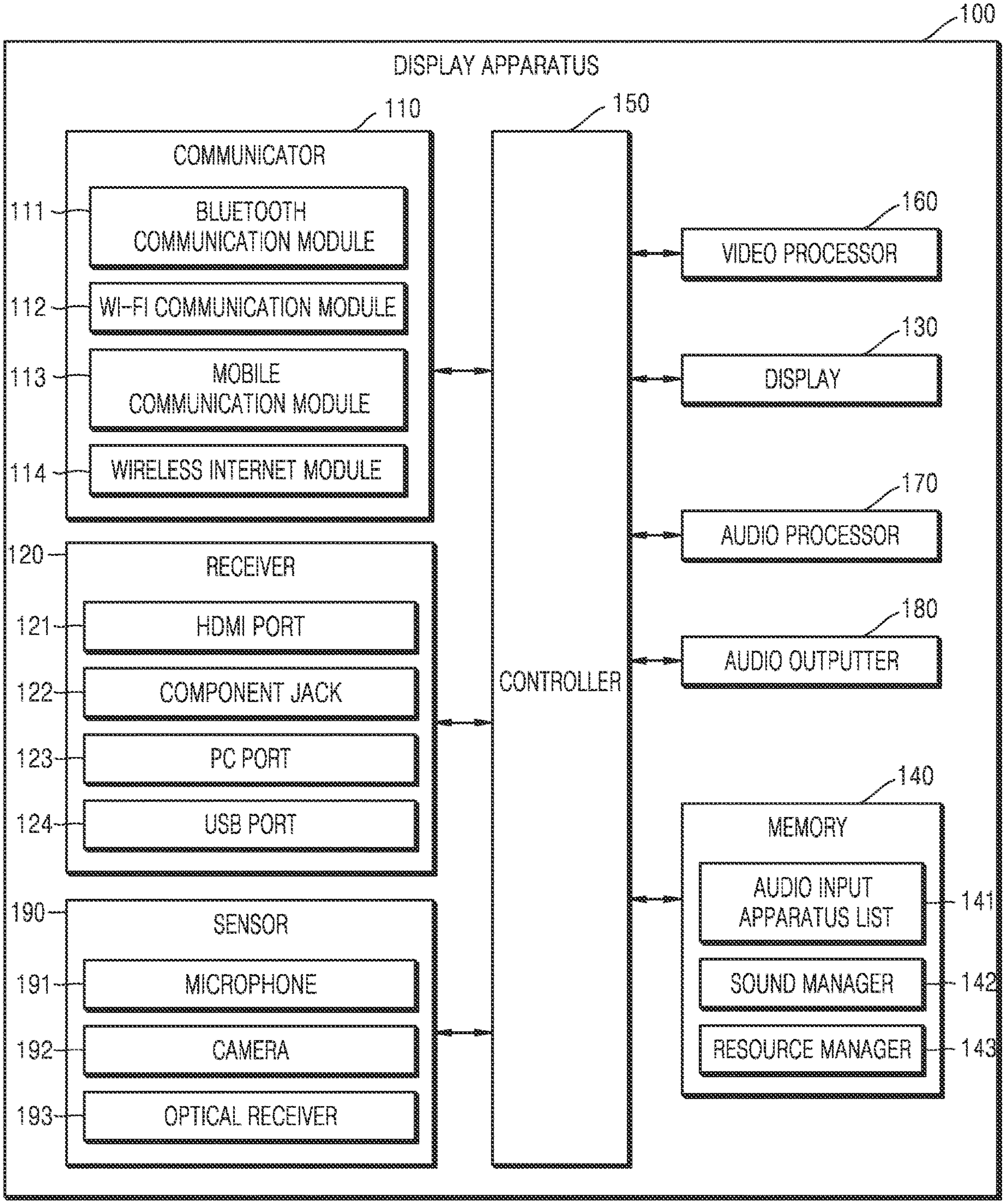
FIG. 4 is a detailed block diagram of an example display apparatus 100 according to various embodiments.

FIG. 4 is a detailed block diagram of an example display apparatus 100 according to various embodiments.

Referring to FIG. 4, in addition to the communicator 110, the receiver 120, the display 130, the memory 140, and the controller 150, the display apparatus 100 may further include a video processor 160, an audio processor 170, an audio outputter 180, and a sensor 190.

The communicator 110 may include one or more modules configured to enable wireless communication between the display apparatus 100 and a wireless communication system or between the display apparatus 100 and a network where another electronic apparatus is located. For example, the communicator 110 may include a Bluetooth communication module 111, a Wi-Fi communication module 112, a mobile communication module 113, and a wireless Internet module 114.

The Bluetooth communication module 111 may perform a Bluetooth communication connection with an external apparatus and perform communication according to the Bluetooth communication protocol.

The Wi-Fi communication module 112 may perform a Wi-Fi communication connection with an external apparatus and perform communication according to the Wi-Fi communication protocol.

The mobile communication module 113 may transmit or receive, via a mobile communication network, a wireless signal to or from at least one of a base station, an external terminal, or a server. The wireless signal may include various types of data based on transmission and reception of voice call signals, video call signals, or text/multimedia messages.

The wireless Internet module 114 refers to, for example, a module for wireless Internet access and may be built into or external to a device. For wireless Internet technology, wireless local area network (WLAN) (Wi-Fi), wireless broadband (WiBro), world interoperability for microwave access (WiMAX), high speed downlink packet access (HSDPA), or the like may be used.

In addition to the Bluetooth communication module, for short-distance communication, the communicator 110 may further include a short-distance communication module using Bluetooth low energy (BLE), radio frequency identification (RFID), infrared communication (infrared data association (IrDA), ultra-wideband (UWB), ZigBee, or the like.

The receiver 120 may receive an image signal and an audio signal received from an external input apparatus according to a connected protocol under control of the controller 150 and output the image signal and the audio signal to the video processor 160 and the audio processor 170, respectively. The receiver 120 may receive a video (e.g., moving images, etc.), audio (e.g., speech, music, etc.), and additional information (e.g., an electronic program guide (EPG), etc.) from the outside of the display apparatus 100 under the control of the controller 150. The receiver 120 may include one or a combination of one or more of a high-definition multimedia interface (HDMI) port 121, a component jack 122, a PC port 123, and a USB port 124. In addition to the HDMI port, the receiver 120 may further include a display port (DP), a thunderbolt, and a mobile high-definition link (MHL).

The sensor 190 may sense speech of a user, an image of the user, or interaction of the user and may include a microphone 191, a camera 192, and an optical receiver 193.

The microphone 191 receives speech uttered by the user. The microphone 191 may convert the received speech into an electrical signal and output the electrical signal to the controller 150.

The camera 192 may receive an image (e.g., consecutive image frames) corresponding to a motion of the user including a gesture in a range identifiable by a camera.

According to an embodiment, when the video call application is running on the display apparatus 100, the camera 192 may capture and obtain an image of the user and transmit the obtained image of the user to the controller 150. The camera 192 may include a microphone inside the camera 192 separately from the microphone 191.

The optical receiver 193 receives an optical signal (including a control signal) received from a remote control apparatus. The optical receiver 193 may receive an optical signal corresponding to a user input (e.g., a touch, a press, a touch gesture, a speech, or a motion) from the remote control apparatus. A control signal may be extracted from the received optical signal under the control by the controller 150.

The video processor 160 (including, e.g., video processing circuitry) may process an image signal received from the receiver 120 or the communicator 110 and output the image signal to the display 130, under the control by the controller 150.

The display 130 may display, on a screen, the image signal received from the video processor 160.

The audio processor 170 (including, e.g., audio processing circuitry) may convert an audio signal received from the receiver 120 or the communicator 110 into an analog audio signal and output the analog audio signal to the audio outputter 180, under the control by the controller 150.

The audio outputter 180 (including, e.g., audio output circuitry) may output the received analog audio signal through a speaker.

The memory 140 may store programs associated with the operation of the display apparatus 100 and various types of data generated during the operation of the display apparatus 100.

According to an embodiment, the memory 140 may include an audio input apparatus list 141, a sound manager 142 configured to manage an audio input/output function of the display apparatus 100, and a resource manager 143 configured to manage information regarding processes activated in the display apparatus 100.

The audio input apparatus list 141 may include, for example, information regarding one or more audio input apparatuses, and the controller 150 may store, in the audio input apparatus list 141, information regarding audio input apparatuses that are connected to or disconnected from the display apparatus 100. The audio input apparatus list 141 will be described in detail with reference to FIGS. 5 and 6.

The sound manager 142 may include one or more instructions for selecting and managing an appropriate audio input apparatus or audio output apparatus when the display apparatus 100 requires audio input or audio output. According to an embodiment, the sound manager 142 may include instructions for performing functions of the display apparatus 100 set forth in the present disclosure.

The resource manager 143 may include one or more instructions for managing information regarding processes activated in the display apparatus 100. The resource manager 143 as described above may identify an application that has received a voice call request or a speech input request.

The controller 150 may include one or more processors and control overall internal components of the display apparatus 100.

According to an embodiment, by executing one or more instructions stored in the memory 140, in particular, one or more instructions included in the sound manager 142, the controller 150 may implement the functions of the display apparatus 100 set forth in the present disclosure.

FIG. 5 shows an example audio input apparatus list according to various embodiments.

Referring to FIG. 5, the audio input apparatus list may include identification information regarding one or more audio input apparatuses. For example, the audio input apparatus list may include a display apparatus built-in microphone identifier, a USB-connected external microphone identifier, a display apparatus-connected webcam microphone identifier, a microphone identifier of a display apparatus remote controller, and a microphone identifier of a display apparatus-connected smart device.

For example, the display apparatus 100 may store, in the audio input apparatus list, information regarding an audio input apparatus that has been previously attempted for connection at least once and was successfully connected when previously attempted for connection, among the audio input apparatuses included in the audio input apparatus list. The display apparatus 100 may further include, in the audio input apparatus list, not only an identifier of an audio input apparatus but also information necessary for connection with the audio input apparatus. For example, in a case of an audio input apparatus connected via Wi-Fi communication or Bluetooth communication, the audio input apparatus list may include information for connecting via Wi-Fi communication or Bluetooth communication used for connection, for example, wireless communication protocol identification information or access information for accessing the audio input apparatus.

When connection with a new audio input apparatus or disconnection from an already connected audio input apparatus is detected, the display apparatus 100 may add, to the audio input apparatus list, information regarding the newly connected audio input apparatus.

FIG. 6 shows another example of an audio input apparatus list according to various embodiments.

An audio input apparatus list 600 shown in FIG. 6 is obtained by further assigning priorities to the audio input apparatuses included in the audio input apparatus list 500 shown in FIG. 5. In addition to simply having the audio input apparatus list as shown in FIG. 5, the display apparatus 100 may assign priorities to and store the audio input apparatuses included in the audio input apparatus list. As described above, when priorities are assigned to the audio input apparatuses, the display apparatus 100 may select, for example, an audio input apparatus with a high priority when an audio input apparatus needs to be selected.

The display apparatus 100 may assign priorities to the audio input apparatuses according to various criteria.

According to an embodiment, the display apparatus 100 may determine a priority of an audio input apparatus based on characteristics of the audio input apparatus. For example, the display apparatus 100 may assign a higher priority to an audio input apparatus built into the display apparatus 100 than to an audio input apparatus external to the display apparatus 100. Referring to FIG. 6, it may be seen that a display apparatus built-in microphone has a higher priority than a microphone external to the display apparatus. For example, the display apparatus 100 may assign a higher priority to an audio input apparatus connected to the display apparatus 100 by wire than to an audio input apparatus wirelessly connected to the display apparatus 100. Referring to FIG. 6, it may be seen that a USB-connected external microphone has a higher priority than a microphone of a remote controller or a microphone of a smart device.

According to an embodiment, the display apparatus 100 may test audio performance of the audio input apparatus, and, based on a result of the test, determine the priority of the audio input apparatus. That is, the display apparatus 100 may receive sound from the audio input apparatuses, compare the sound with sound received from the audio input/output apparatus 300, and determine an audio input apparatus having a most similar waveform as an audio input apparatus with good speech clarity of a user.

For example, when a new audio input apparatus is connected, the display apparatus 100 may receive sound by temporarily activating a speech input of the audio input/output apparatus 300, then simultaneously activate all of the audio input apparatuses currently in the audio input apparatus list, and determine speech clarity of the user based on the degree to which a waveform of each received sound is most similar to a waveform of sound input from the audio input/output apparatus 300. When the audio input apparatuses in the audio input apparatus list are unable to be simultaneously activated, input sound may be received by sequentially activating the audio input apparatuses.

Alternatively, the display apparatus 100 may activate all of the audio input apparatuses in the audio input apparatus list, then temporarily output a certain sound through a speaker, and determine speech clarity of the user based on the degree to which a waveform of sound input from each audio input apparatus is most similar to a waveform of sound input from the audio input/output apparatus.

According to an embodiment, the priority assigned to each audio input apparatus in the audio input apparatus list 600 may be periodically updated. For example, when game content is executed and audio output starts through the audio input/output apparatus, the display apparatus 100 may periodically re-evaluate and update the priority at regular time intervals, for example, once per second. Alternatively, the display apparatus 100 may update the priority whenever an event occurs that causes a new audio input apparatus to be connected or disconnected. Alternatively, in order to increase the accuracy of evaluation, the display apparatus 100 may be configured to update the priority at a time point when a request for the audio input apparatus is actually needed.

When a plurality of audio input/output apparatuses are connectable to the display apparatus 100, the display apparatus 100 may manage audio input apparatuses with separate priorities by evaluating the audio input apparatuses in association with each of the plurality of audio input/output apparatuses. For example, the display apparatus 100 may manage a first priority list corresponding to a first audio input/output apparatus by evaluating one or more audio input apparatuses in association with the first audio input/output apparatus, and may manage a second priority list corresponding to a second audio input/output apparatus by evaluating one or more audio input apparatuses in association with a second audio input/output apparatus.

According to an embodiment, the display apparatus 100 may provide a graphical user interface that allows a user to select priorities between one or more audio input apparatuses, and determine the priorities of the audio input apparatuses based on a user input of selecting priorities in response to the graphical user interface.

According to an embodiment, the display apparatus 100 may select an audio output apparatus according to a preset priority from a list prioritized as described above, and may further consider whether each audio output apparatus is activated. One or more audio output apparatuses included in an audio output apparatus list may be in an activated state or deactivated state. The activated state may refer to, for example, a state in which an audio output apparatus may receive and immediately output audio data. The deactivated state may refer to, for example, a state in which an audio output apparatus is unable to receive and immediately output audio data. For example, the deactivated state may refer to, for example, a state in which the audio output apparatus is not connected to the display apparatus 100 or is not properly operating. The audio output apparatus list is prioritized according to certain criteria and stored by the display apparatus 100. However, when the audio output apparatus is in a deactivated state, this may indicate that the audio output apparatus is not available, and thus, the audio output apparatus may be excluded from selection. For example, in a case of a USB-connected external microphone, when the USB-connected external microphone is not connected to the display apparatus 100, this indicates that the USB-connected external microphone is in a deactivated state. Thus, the USB-connected external microphone may be excluded from selection of audio output apparatuses.

Figure 7:
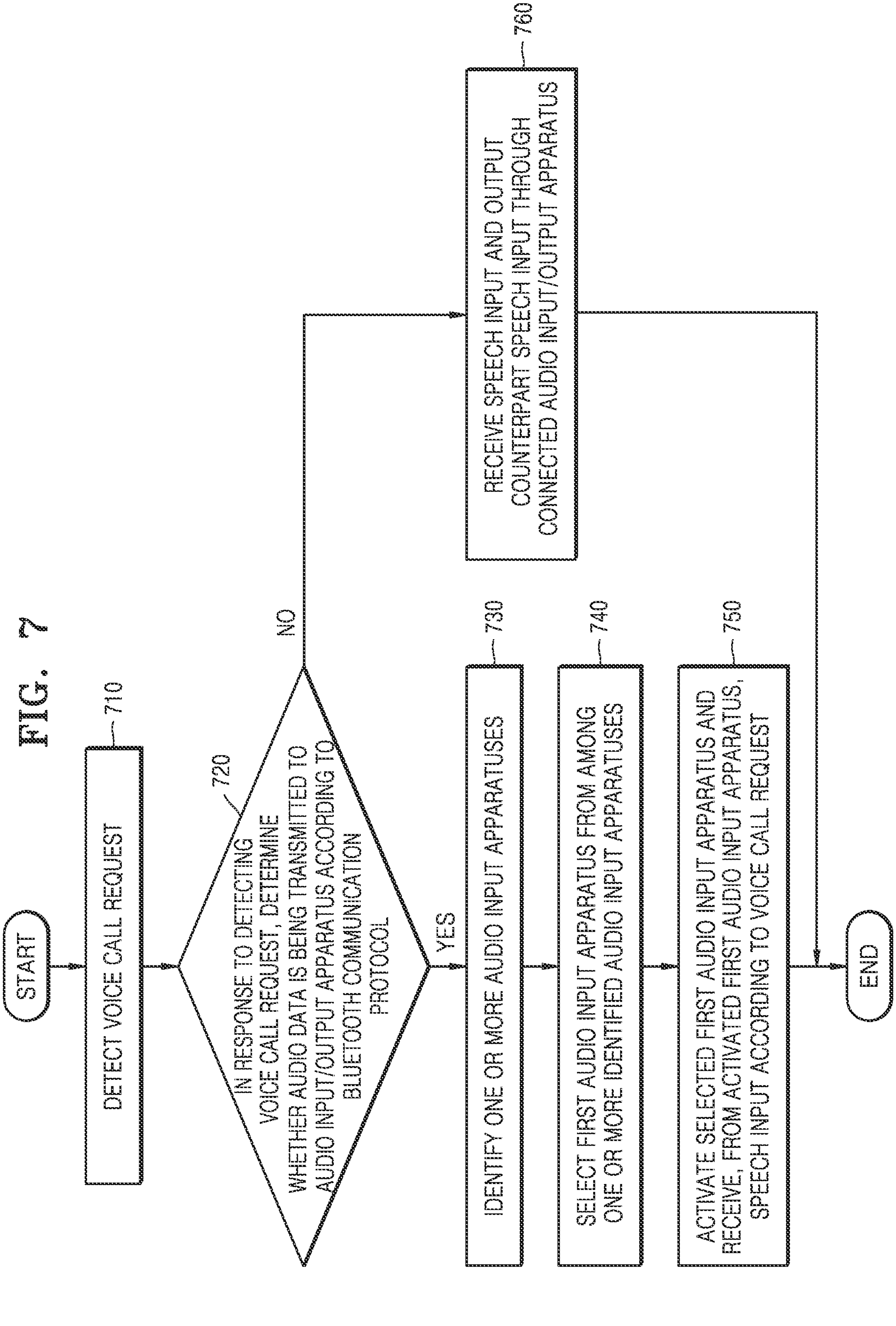
FIG. 7 is a flowchart illustrating an example operating method of a display apparatus, according to various embodiments.

FIG. 7 is a flowchart illustrating an example operating method of a display apparatus, according to various embodiments.

Referring to FIG. 7, in operation 710, the display apparatus 100 may detect a voice call request. For example, the display apparatus 100 may detect a voice call request according to a user input of executing an application exclusively for voice calls. Alternatively, the display apparatus 100 may detect a voice call request according to a user input of selecting a voice call menu, which is provided as part of an application exclusively for game content.

In operation 720, in response to detecting the voice call request, the display apparatus 100 may determine whether audio data is being transmitted to an audio input/output apparatus according to a Bluetooth communication protocol. The sound manager is an application that manages sound input to the display apparatus 100 and output from the display apparatus 100. The sound manager may store state information regarding to which audio input/output apparatus the display apparatus 100 is currently connected and whether audio data is being input or output. Through the sound manager as described above, the display apparatus 100 may determine whether the audio data is being transmitted to the audio input/output apparatus according to the Bluetooth communication protocol.

As a result of the determination in operation 720, when the audio data is not being transmitted to the audio input/output apparatus according to the Bluetooth communication protocol, operation 760 may be performed.

In operation 760, the display apparatus 100 may receive a speech input of a user through the connected audio input/output apparatus, transmit the speech input to a voice call counterpart apparatus, receive a speech input of a counterpart, which is received from the voice call counterpart apparatus, and output the speech input to the audio input/output apparatus.

As a result of the determination in operation 720, when the audio data is being transmitted to the audio input/output apparatus according to the Bluetooth communication protocol, operation 730 may be performed.

In operation 730, the display apparatus 100 may identify one or more audio input apparatuses. When it is identified in the determination of operation 720 that the already connected audio input/output apparatus is outputting the audio data, the display apparatus 100 may search for an audio input apparatus other than the audio input/output apparatus to separate an audio data output path from an audio input path. As described above, the reason for separating the audio data output path from an audio data input path is that, when audio input and audio output are simultaneously performed using the already connected audio input/output apparatus, a Bluetooth communication profile needs to be changed, and the sound quality of output audio data may deteriorate according to the Bluetooth communication profile corresponding to two-way communication. Accordingly, as much as possible, the display apparatus 100 is to use the audio input/output apparatus, which is currently outputting the audio data, only for the purpose of audio data output and to receive an audio input for a voice call through a separate audio input apparatus.

According to an embodiment, based on one or more audio input apparatuses included in an audio input apparatus list, the display apparatus 100 may identify the one or more audio input apparatuses.

In operation 740, the display apparatus 100 may select a first audio input apparatus from among the one or more identified audio input apparatuses.

The display apparatus 100 may select, as the first audio input apparatus, an audio input apparatus whose performance is most similar to an audio input/output apparatus currently worn by the user, from among the one or more identified audio input apparatuses.

According to an embodiment, the display apparatus 100 may select, as the first audio input apparatus, an audio input apparatus with a highest priority in the audio input apparatus list. As described above, the display apparatus 100 may determine priorities based on characteristics of one or more audio input apparatuses in the audio input apparatus list, may test performance of the one or more audio input apparatuses and determine priorities based on a result of the performance test, or may determine priorities based on a user input selected by a user.

According to an embodiment, the display apparatus 100 may test performance of the one or more audio input apparatuses included in the audio input apparatus list in real time and select, as the first audio input apparatus, an audio input apparatus showing the best performance as a result of the performance test.

In operation 750, the display apparatus 100 may activate the selected first audio input apparatus and receive, from the activated first audio input apparatus, a speech input of the user according to the voice call request. In addition, the display apparatus 100 may receive, from a counterpart apparatus, a counterpart speech input according to a voice call, mix the received counterpart speech input with the audio data, and transmit the same to the audio input/output apparatus.

Figure 8:
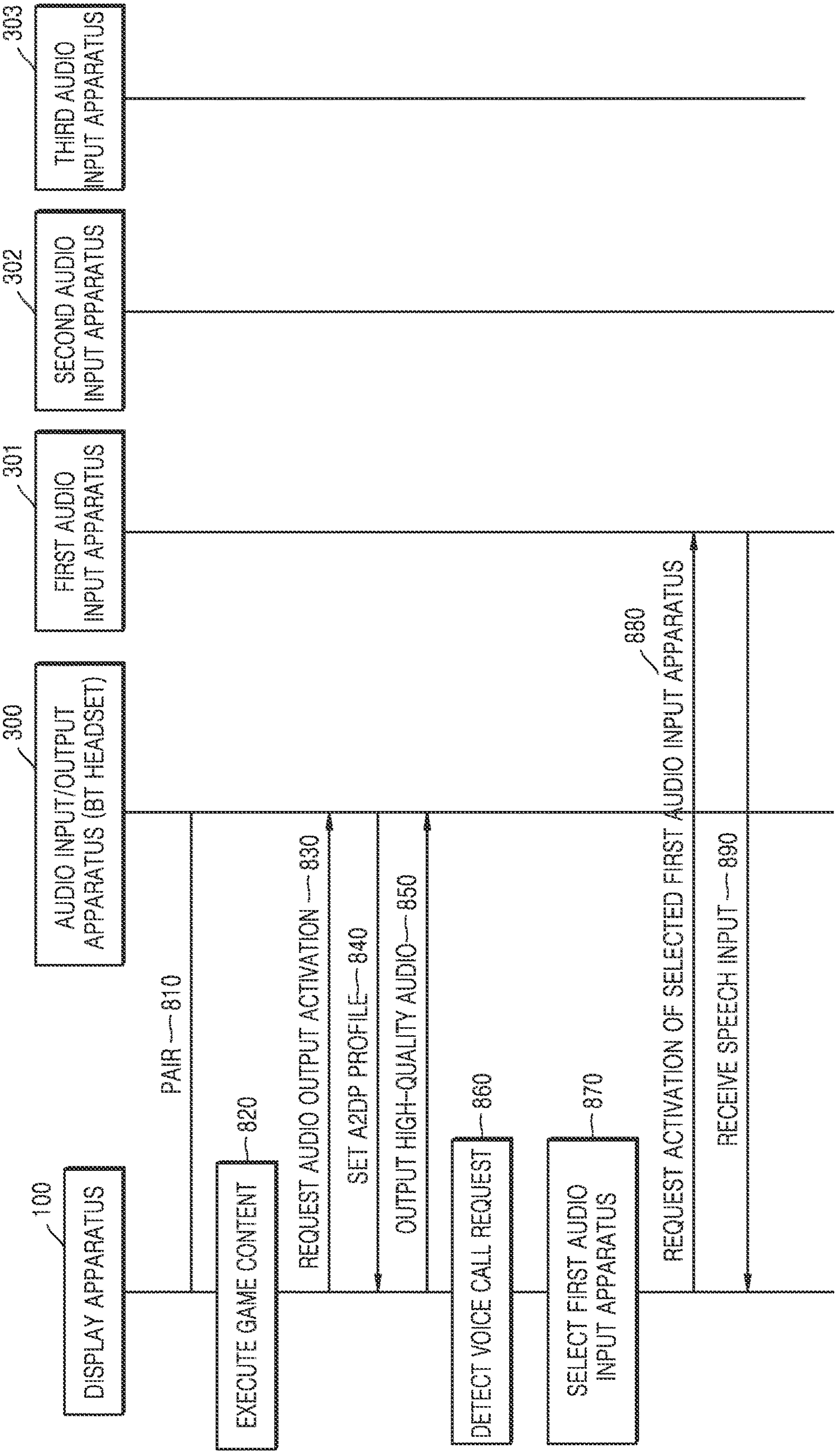
FIG. 8 shows an example operating method of a display apparatus, according to various embodiments.

FIG. 8 shows an example operating method of a display apparatus, according to various embodiments.

Referring to FIG. 8, in operation 810, the display apparatus 100 and the audio input/output apparatus 300 may perform a pairing operation according to a Bluetooth communication protocol. Through the pairing operation, the display apparatus 100 and the audio input/output apparatus 300 may be ready to communicate with each other.

In operation 820, the display apparatus 100 may start executing game content. For example, a user of the display apparatus 100 may start executing game content by selecting a game content execution menu. When there is audio data corresponding to the game content in response to executing the game content, the display apparatus 100 may perform operation 830 to output the audio data to the paired audio input/output apparatus 300.

In operation 830, the display apparatus 100 may transmit an audio output activation request to the audio input/output apparatus 300.

In operation 840, the audio input/output apparatus 300 that has received the audio output activation request may request the display apparatus 100 to communicate according to an A2DP profile, which is used for audio stream transmission, among Bluetooth communication profiles.

In operation 850, the display apparatus 100 may output, to the audio input/output apparatus 300, the audio data corresponding to the game content according to the A2DP profile. An A2DP Bluetooth profile is a profile for transmitting high-quality audio streams in one direction. The display apparatus 100 may output, to the audio input/output apparatus 300, the audio data corresponding to the game content in high sound quality according to the A2DP profile.

While the audio data is being output to the audio input/output apparatus 300 by executing the game content as described above, in operation 860, the display apparatus 100 may detect a voice call request. For example, while playing the game content by using the display apparatus 100, a user may execute a voice call application to make a voice call with a friend. The display apparatus 100 may detect a voice call request by receiving a user input for executing the voice call application from the user.

In operation 870, in response to detecting the voice call request, the display apparatus 100 may select a first audio input apparatus. Because the display apparatus 100 is already paired with the audio input/output apparatus 300 and outputs audio data to the audio input/output apparatus 300, the display apparatus 100 may also receive a user speech for a voice call through the audio input/output apparatus 300. However, when audio data output and speech input are performed together through the audio input/output apparatus 300, the Bluetooth profile needs to be changed to an HFP profile for two-way communication, and the sound quality of output audio data is likely to deteriorate according to the HFP profile. Accordingly, the display apparatus 100 may select another separate apparatus for receiving speech, that is, the first audio input apparatus, instead of the audio input/output apparatus 300 that is currently outputting the audio data.

The display apparatus 100 may manage an audio input apparatus list including one or more audio input apparatuses and select the first audio input apparatus from among the one or more audio input apparatuses included in the audio input apparatus list. According to an example, the display apparatus 100 may select, as the first audio input apparatus, an audio input apparatus with a highest priority from among the one or more audio input apparatuses included in the audio input apparatus list. For example, a display apparatus built-in microphone with a highest priority in the audio input apparatus list as shown in FIG. 6 may be selected as the first audio input apparatus. According to another example, the display apparatus 100 may test performance of the one or more audio input apparatuses included in the audio input apparatus list in real time and select, as the first audio input apparatus, an audio input apparatus with the best performance as a result of the performance test.

In operation 880, the display apparatus 100 may transmit an audio input activation request to the selected first audio input apparatus 301.

In operation 890, the first audio input apparatus 301 may receive a speech input in response to the audio input activation request and transmit the received speech input to the display apparatus 100.

By performing a voice call service according to the voice call request of the user through the first audio input apparatus 301 and maintaining the output of the audio data corresponding to the game content to the audio input/output apparatus 300, the display apparatus 100 may provide the voice call service according to a user request while maintaining the output of high-quality audio data.

Figure 9:
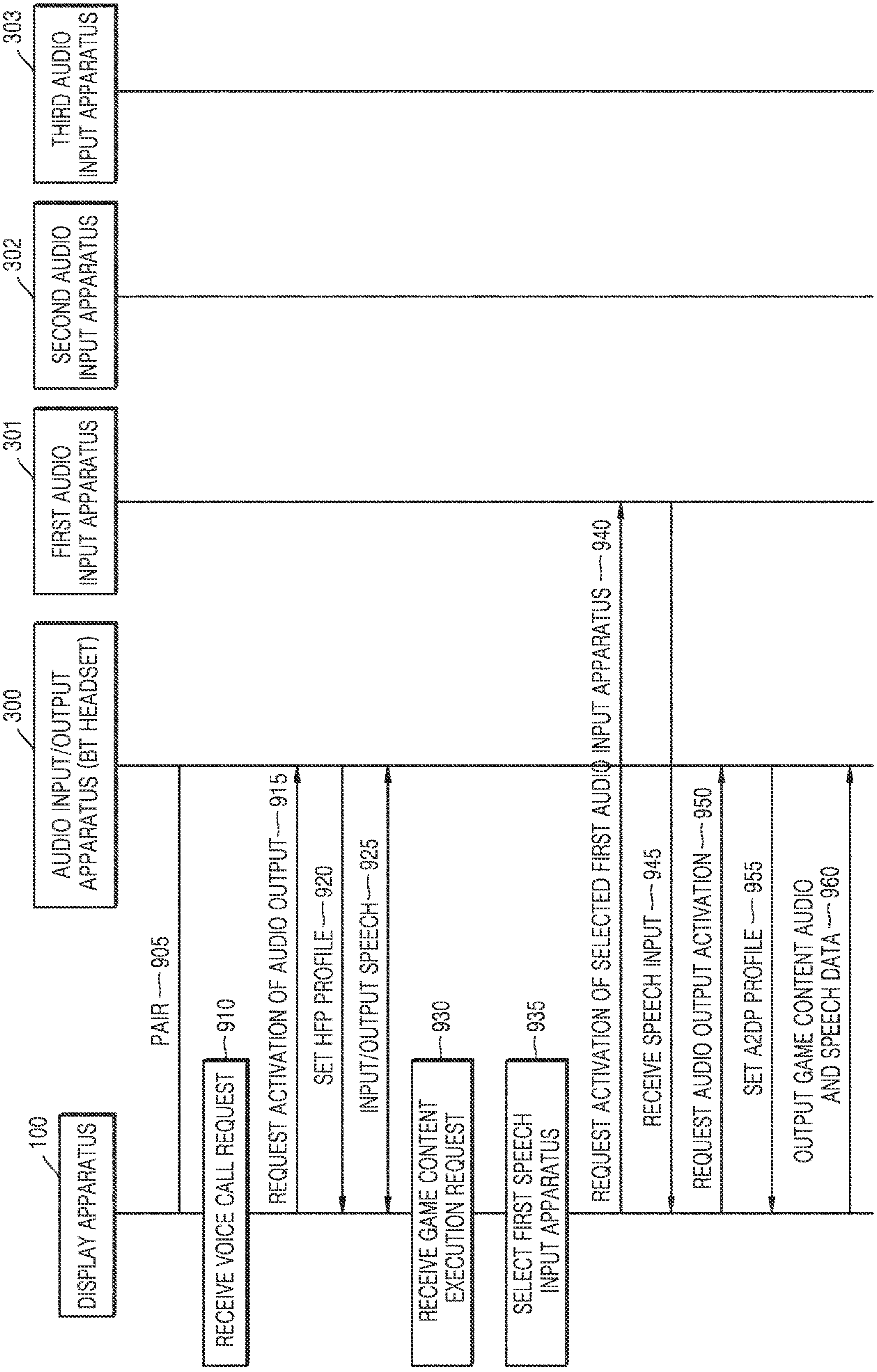
FIG. 9 shows an example operating method of a display apparatus, according to various embodiments.

FIG. 9 shows another example operating method of a display apparatus, according to various embodiments.

Referring to FIG. 9, in operation 905, the display apparatus 100 and the audio input/output apparatus 300 may perform a pairing operation according to a Bluetooth communication protocol. Through the pairing operation, the display apparatus 100 and the audio input/output apparatus 300 may be ready to communicate with each other.

In operation 910, the display apparatus 100 may receive a voice call request. For example, a user may execute a voice call application to make a voice call with a friend by using the display apparatus 100. The display apparatus 100 may detect a voice call request by receiving a user input for executing the voice call application from the user.

In operation 915, the display apparatus 100 may transmit an audio input/output activation request to the audio input/output apparatus 300.

In operation 920, the audio input/output apparatus 300 that has received the audio input/output activation request may request the display apparatus 100 to communicate according to an HFP profile, which is used for two-way data transmission and reception, among Bluetooth communication profiles.

In operation 925, the display apparatus 100 may transmit or receive speech data according to a voice call service to the audio input/output apparatus 300 according to the HFP profile. In detail, the display apparatus 100 may output, to the audio input/output apparatus 300, counterpart speech data received from a voice call counterpart apparatus, receive, from the audio input/output apparatus 300, speech data of the user input to the audio input/output apparatus 300, and transmit the speech data to the voice call counterpart apparatus.

As described above, while the voice call service is provided using the audio input/output apparatus 300, in operation 930, the display apparatus 100 may receive a game content execution request. For example, a user of the display apparatus 100 may start executing game content by selecting a game content execution menu.

Because the display apparatus 100 is already paired with the audio input/output apparatus 300 and outputs speech data to the audio input/output apparatus 300, the display apparatus 100 may also output audio data corresponding to the game content through the audio input/output apparatus 300. However, when audio data output and speech input are performed together through the audio input/output apparatus 300, the sound quality of output audio data is likely to deteriorate according to the HFP profile. Accordingly, the display apparatus 100 may select another separate apparatus for receiving speech, that is, a first audio input apparatus, instead of the audio input/output apparatus 300 currently used for transmitting and receiving speech data, and may control the audio input/output apparatus 300 to be used exclusively for audio data output.

In operation 935, the display apparatus 100 may select the first audio input apparatus. The operation of selecting the first audio input apparatus for receiving a speech input is the same as described in operation 870 of FIG. 8 and is thus the description of the operation is not repeated here.

In operation 940, the display apparatus 100 may output, to the first audio input apparatus, an activation request for the selected first audio input apparatus.

In operation 945, in response to such an audio input activation request, the display apparatus 100 may receive input speech data from the first audio input apparatus.

In operation 950, the display apparatus 100 may transmit an audio output activation request to the audio input/output apparatus 300.

In operation 955, the audio input/output apparatus 300 that has received the audio output activation request may request the display apparatus 100 to communicate according to an A2DP profile, which is used for audio stream transmission, among the Bluetooth communication profiles.

In operation 960, the display apparatus 100 may mix the audio data corresponding to the game content with the counterpart speech data according to the A2DP profile and output the same to the audio input/output apparatus 300. The A2DP Bluetooth profile is a profile for transmitting high-quality audio streams in one direction. The display apparatus 100 may output, to the audio input/output apparatus 300, the audio data corresponding to the game content in high sound quality according to the A2DP profile.

When there is a game content execution request from a user while providing a voice call service using the audio input/output apparatus 300, the display apparatus 100 is configured to receive a user speech input by activating a separate audio input apparatus for a user speech input for the voice call service, outputs the audio data corresponding to the game content using the already connected audio input/output apparatus 300, and separates a speech reception path from an audio data output path. Accordingly, the display apparatus 100 may provide the voice call service according to a user request while ensuring the output of high-quality audio data.

According to the aforementioned embodiments, in order to provide the voice call service while audio data is output using the audio input/output apparatus, the display apparatus 100 receives a speech input by activating an audio input apparatus other than the already connected audio input/output apparatus, and may thus maintain the quality of audio data output to the audio input/output apparatus. However, when the display apparatus 100 automatically selects and activates a third audio input apparatus to provide the voice call service as described above, the user may not recognize this, or this may be against intention of the user. Accordingly, the display apparatus may provide a user interface that allows the user to recognize such a situation.

Figure 10:
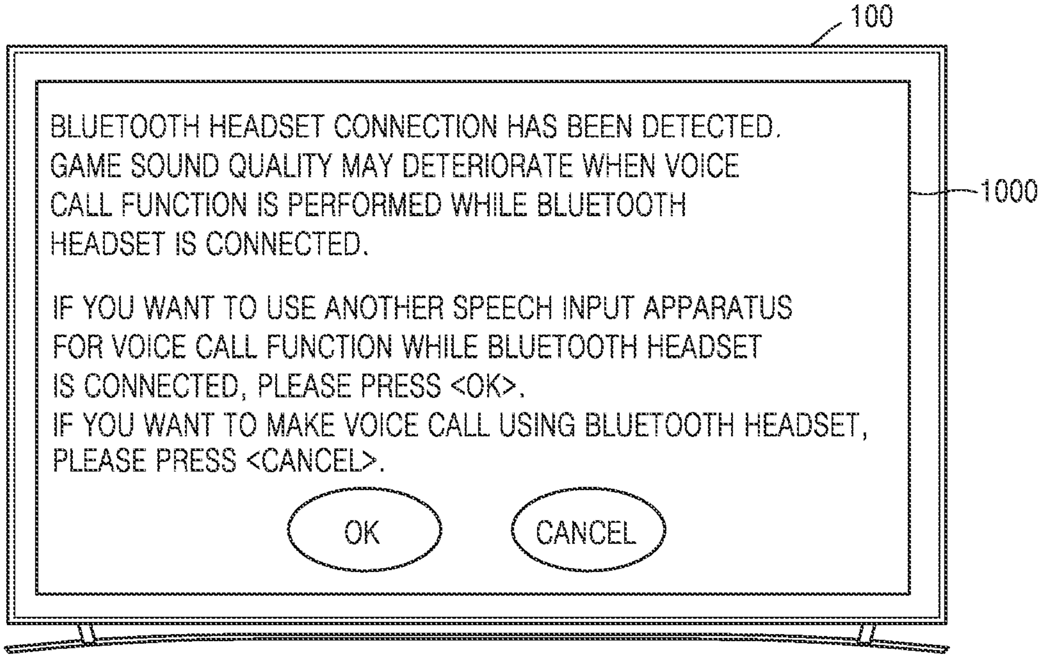
FIG. 10 shows an example user interface that, in order to provide a voice call service while audio data is output by using an audio input/output apparatus, allows a user to recognize a state of receiving a speech input by activating an audio input apparatus other than the already connected audio input/output apparatus, according to various embodiments.

FIG. 10 shows an example user interface that, in order to provide a voice call service while audio data is output using an audio input/output apparatus, allows a user to recognize a state of receiving a speech input by activating an audio input apparatus other than the already connected audio input/output apparatus, according to various embodiments.

Referring to FIG. 10, the display apparatus 100 may output a user interface 1000 including a message "Bluetooth headset connection has been detected. Game sound quality may deteriorate when a voice call function is performed while the Bluetooth headset is connected. If you want to use another speech input apparatus for the voice call function while the Bluetooth headset is connected, please press <OK>. If you want to make a voice call using the Bluetooth headset, please press <Cancel>."

When the user selects <OK> in response to the user interface 1000 as described above, the display apparatus 100 may select and activate a separate audio input apparatus for receiving a speech input for the voice call function according to the method set forth in the present disclosure. When the user selects <Cancel> in response to the user interface 1000 as described above, the display apparatus 100 may output audio data through the already connected audio input/output apparatus, that is, the Bluetooth headset, without activating a separate audio input apparatus for receiving a speech input for the voice call function, and may transmit or receive speech data for the voice call function.

According to an embodiment, in order to provide the voice call service while audio data is output using the audio input/output apparatus, the display apparatus 100 receives a speech input by activating an audio input apparatus other than the already connected audio input/output apparatus, and may thus provide a user interface that allows the user to select another audio input apparatus to maintain the quality of audio data output to the audio input/output apparatus. As described above, by providing the user interface in advance and allowing the user to set another audio input apparatus, an environment that suits the intention of the user may be provided.

Figure 11:
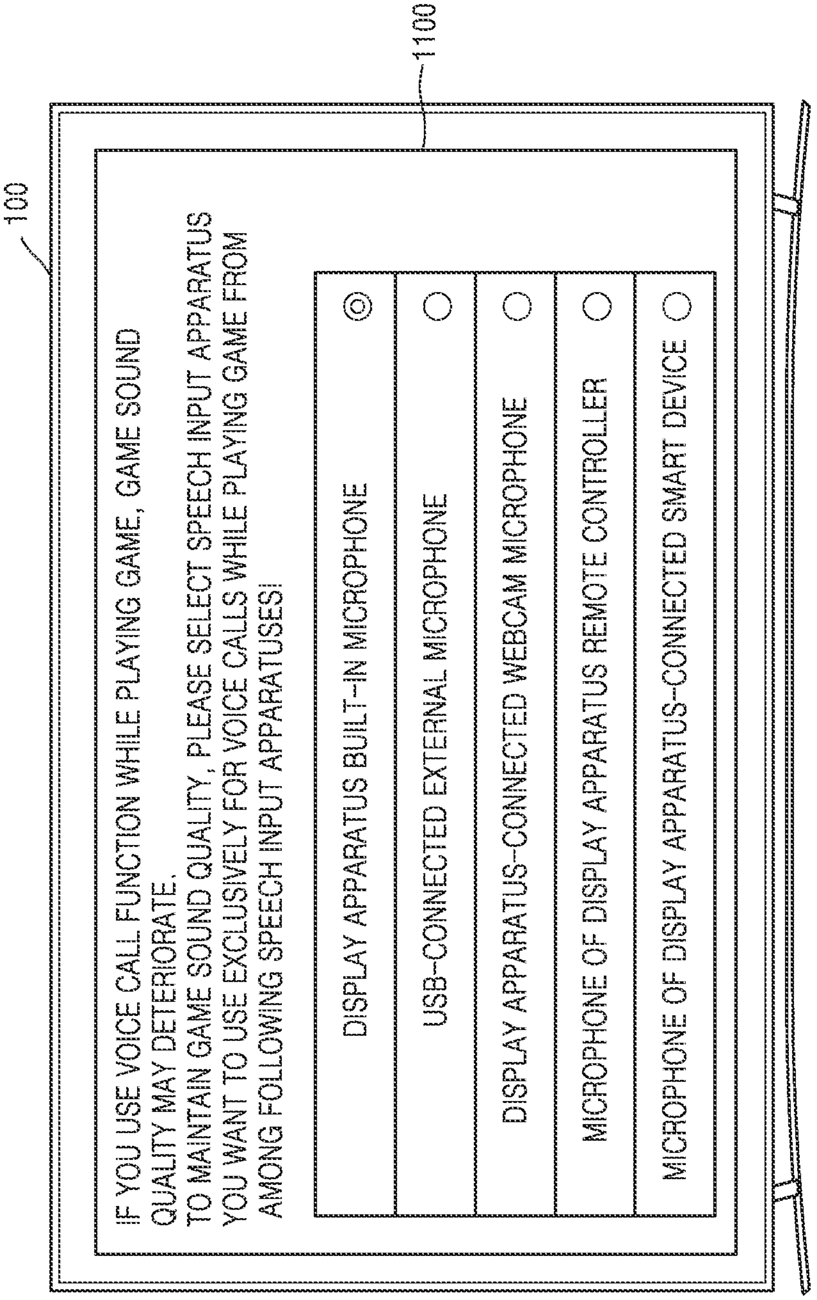
FIG. 11 shows an example user interface that, in order to provide a voice call service while audio data is output by using an audio input/output apparatus, activates an audio input apparatus other than the already connected audio input/output apparatus and allows a user to select another audio input apparatus to receive a speech input, according to various embodiments.

FIG. 11 shows an example user interface that, in order to provide a voice call service while audio data is output using an audio input/output apparatus, activates an audio input apparatus other than the already connected audio input/output apparatus and allows a user to select another audio input apparatus to receive a speech input, according to various embodiments.

Referring to FIG. 11, the display apparatus 100 may output a user interface 1100 including a message "If you use a voice call function while playing a game, game sound quality may deteriorate. To maintain the game sound quality, please select speech input apparatus you want to use exclusively for voice calls while playing the game from among the following speech input apparatuses!"

In response to the user interface 1100 as described above, the user may make an input to select one of a display apparatus built-in microphone, a USB-connected external microphone, a display apparatus-connected webcam microphone, a microphone of a display apparatus remote controller, and a microphone of a display apparatus-connected smart device. According to the user selection as described above, the display apparatus 100 may select and activate an audio input apparatus selected by the user as a separate audio input apparatus for receiving a speech input for a voice call function according to the method set forth in the present disclosure. For example, when the user selects the display apparatus built-in microphone, in order to provide a voice call service while audio data is output using the Bluetooth headset, the display apparatus 100 receives a speech input by activating the display apparatus built-in microphone rather than the already connected Bluetooth headset, and may thus provide the voice call function to the user while maintaining the quality of audio data output to the Bluetooth headset.

According to an embodiment, in order to provide a speech input service while audio data is output using the audio input/output apparatus, when the display apparatus 100 receives a speech input by activating an audio input apparatus other than the already connected audio input/output apparatus, the display apparatus 100 may select an audio input apparatus based on the type of application that has received a speech input service request. As described above, by selecting the audio input apparatus based on the type of application that has received the speech input service request, an audio input apparatus suitable for a current usage environment of the display apparatus may be used.

Figure 12:
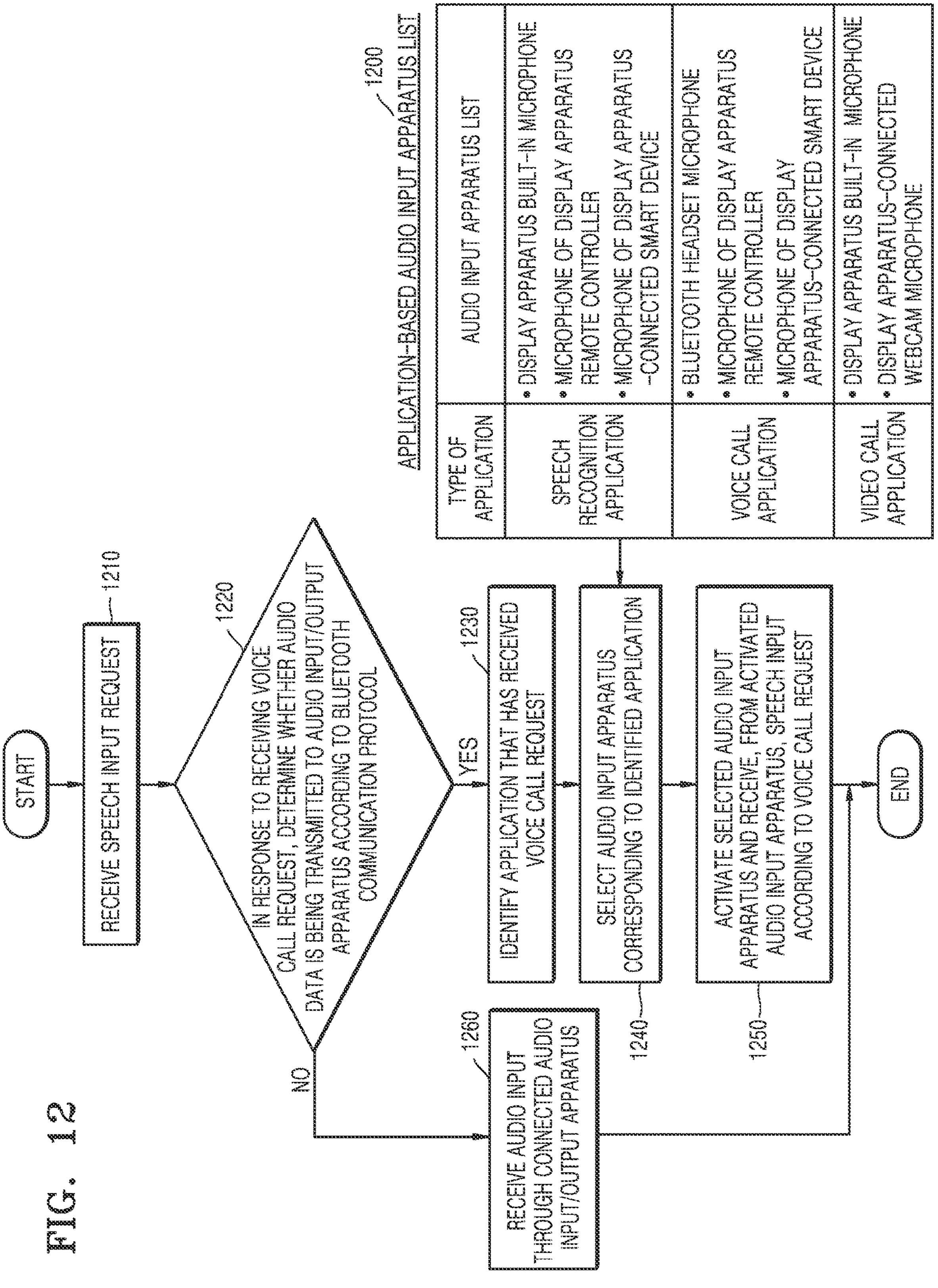
FIG. 12 is a flowchart illustrating an example operating method of a display apparatus that selects an audio input apparatus based on a type of application that has received a speech input request, according to various embodiments.

FIG. 12 is a flowchart illustrating an example operating method of a display apparatus that selects an audio input apparatus based on a type of application that has received a speech input request, according to various embodiments.

Referring to FIG. 12, in operation 1210, the display apparatus 100 may receive a speech input request.

In operation 1220, in response to receiving a voice call request, the display apparatus 100 may determine whether audio data is being transmitted to an audio input/output apparatus according to a Bluetooth communication protocol. The sound manager is an application that manages sound input to the display apparatus 100 and output from the display apparatus 100. The sound manager may store state information regarding to which audio input/output apparatus the display apparatus 100 is currently connected and whether audio data is being input or output. Through the sound manager as described above, the display apparatus 100 may determine whether audio data is being transmitted to the audio input/output apparatus according to the Bluetooth communication protocol. As a result of the determination in operation 1220, when audio data is not being transmitted to the audio input/output apparatus according to the Bluetooth communication protocol, operation 1260 may be performed.

In operation 1260, the display apparatus 100 may receive a speech input of a user through the connected audio input/output apparatus, transmit the speech input to a voice call counterpart apparatus, receive a speech input of a counterpart, which is received from the voice call counterpart apparatus, and output the speech input to the audio input/output apparatus.

As a result of the determination in operation 1220, when the audio data is being transmitted to the audio input/output apparatus according to the Bluetooth communication protocol, operation 1230 may be performed.

In operation 1230, the display apparatus 100 may identify an application that has received the speech input request. The application that has received the speech input request may include, for example, a speech recognition application, a voice call application, or a video call application. The speech recognition application may include, for example, an application that receives and processes a speech command of a user or a speech assistant application. The voice call application may refer to, for example, an application exclusively for voice call services. The video call application may refer to, for example, an application exclusively for video call services.

In operation 1240, the display apparatus 100 may select an audio input apparatus corresponding to the identified application.

According to the type of application that may receive the speech input request, the display apparatus 100 may store an audio input apparatus list corresponding to each type of application.

For example, referring to FIG. 12, an audio input apparatus list corresponding to the speech recognition application may include a display apparatus built-in microphone, a microphone of a display apparatus remote controller, and a microphone of a display apparatus-connected smart device. An audio input apparatus list corresponding to the voice call application may include a Bluetooth headset microphone, a microphone of a display apparatus remote controller, and a microphone of a display apparatus-connected smart device. An audio input apparatus list corresponding to the video call application may include a display apparatus built-in microphone or a display apparatus-connected webcam microphone. As described above, the example lists shown in FIG. 12 are merely examples, and the display apparatus 100 may determine various audio input apparatuses included in the audio input apparatus list corresponding to each application according to various standards and policies. Also, priorities of one or more audio input apparatuses included in the audio input apparatus list corresponding to each application may be determined according to the method described with reference to FIG. 6. In this case, the display apparatus may, for example, select an audio input apparatus with a highest priority in the audio input apparatus list corresponding to each application.

In operation 1250, the display apparatus 100 may activate the selected audio input apparatus and receive, from the activated audio input apparatus, a speech input of the user according to the voice call request.

Figure 13:
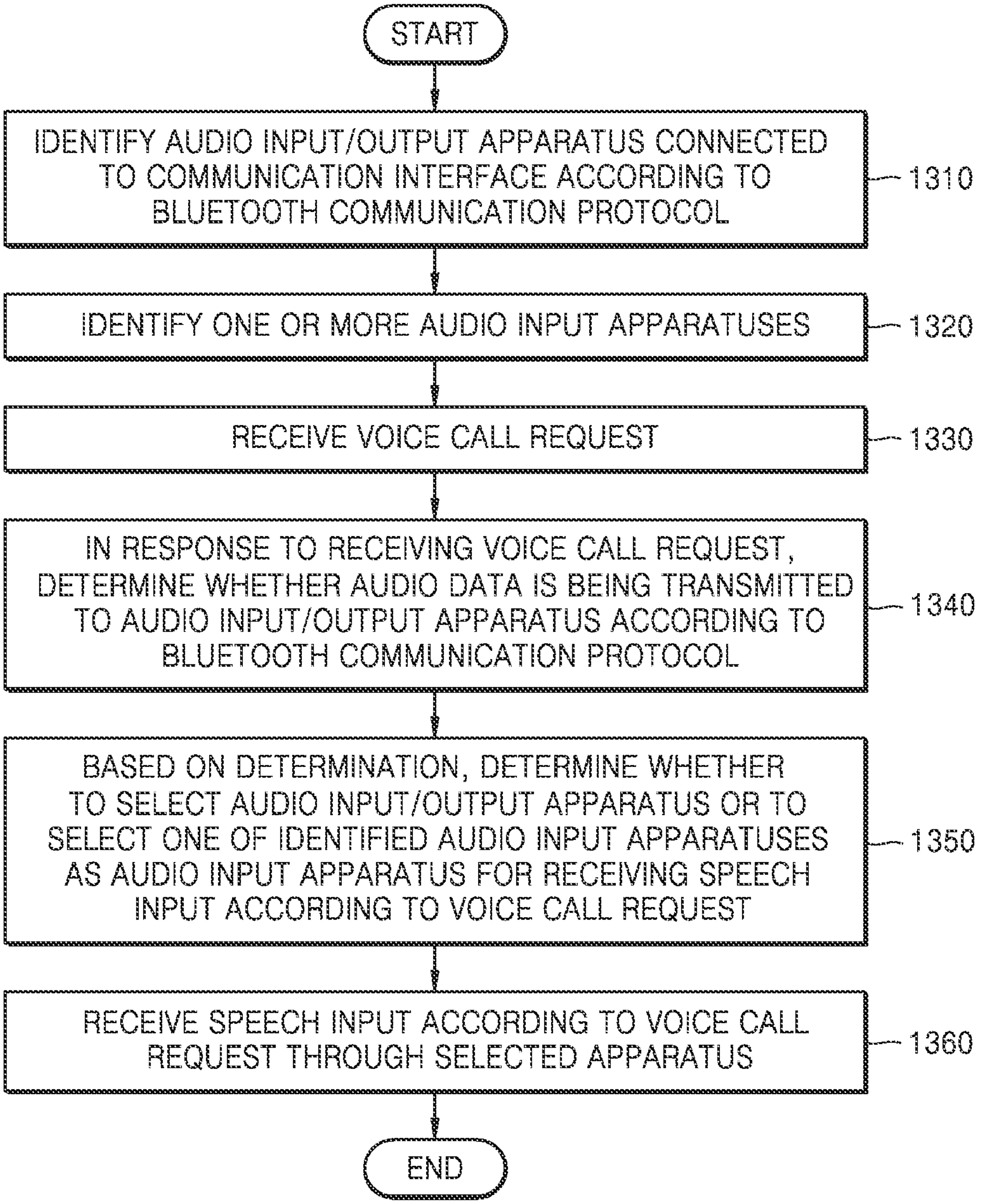
FIG. 13 is a flowchart illustrating an example operating method of a display apparatus that selects an audio input apparatus in response to reception of a speech input request, according to various embodiments.

FIG. 13 is a flowchart illustrating an example operating method of a display apparatus that selects an audio input apparatus in response to reception of a speech input request, according to various embodiments.

Referring to FIG. 13, in operation 1310, the display apparatus 100 may identify an audio input/output apparatus connected to a communication interface according to a Bluetooth communication protocol. The display apparatus 100 may identify an audio input/output apparatus by receiving identification information about the audio input/output apparatus during a Bluetooth connection process with the audio input/output apparatus. The audio input/output apparatus is an apparatus that may perform both audio input and output and may include, for example, a Bluetooth headset.

In operation 1320, the display apparatus 100 may identify one or more audio input apparatuses. The display apparatus 100 may identify one or more audio input apparatuses by obtaining a list of one or more audio input apparatuses, which is pre-stored in a memory. Alternatively, the display apparatus 100 may identify one or more audio input apparatuses by identifying one or more audio input apparatuses that have a connection history with the display apparatus 100. An audio input apparatus list may include, for example, a display apparatus built-in microphone, a microphone of a display apparatus remote controller, and a microphone of a display apparatus-connected smart device.

In operation 1330, the display apparatus 100 may receive a voice call request. For example, the display apparatus 100 may receive the voice call request according to an execution request of an application that performs a voice call function.

In operation 1340, in response to receiving the voice call request, the display apparatus 100 may determine whether audio data is being transmitted to the audio input/output apparatus according to the Bluetooth communication protocol. The display apparatus 100 may determine whether audio data is being transmitted to the audio input/output apparatus, by identifying an audio resource manager, a Bluetooth communication module, or a Bluetooth communication profile used by the Bluetooth communication module for data transmission and reception. For example, the audio resource manager may manage the state of the display apparatus 100 transmitting audio data or information about an audio output apparatus that transmits audio data. For example, the Bluetooth communication module may manage information regarding an audio input/output apparatus, which is subject to data transmission and reception operation, or the state of data transmission and reception operation.

In operation 1350, based on the determination in operation 1340, the display apparatus 100 may determine whether to select an audio input/output apparatus or to select one of the identified audio input apparatuses as an audio input apparatus for receiving a speech input according to the voice call request.

In detail, when it is determined that the audio data is being transmitted to the audio input/output apparatus according to the Bluetooth communication protocol, the display apparatus 100 may select one of the audio input apparatuses identified in operation 1320 as an audio input apparatus for receiving a speech input according to the voice call request. When the audio data is being transmitted to the audio input/output apparatus according to the Bluetooth communication protocol, the display apparatus 100 may separate an audio output channel (i.e., outputting audio data to an audio input/output apparatus) from an audio input channel (i.e., receiving a speech input through an identified audio input apparatus), by selecting an audio input apparatus other than the audio input/output apparatus as an apparatus for receiving a speech input. By separating the audio output channel from the audio input channel as described above, the display apparatus 100 may maintain the audio data output to the audio input/output apparatus in high quality.

When it is determined that the audio data is not being transmitted to the audio input/output apparatus according to the Bluetooth communication protocol, the display apparatus 100 may select the audio input/output apparatus identified in operation 1310 as an audio input apparatus for receiving a speech input according to the voice call request. In this case, because issues such as separation of the audio output channel and the audio input channel do not occur, the display apparatus 100 may select the audio input/output apparatus connected to the communication interface according to the Bluetooth communication protocol as an audio apparatus for receiving a speech input.

In operation 1360, the display apparatus 100 may control a speech input according to the voice call request so as to be received through the apparatus selected in operation 1350.

Some embodiments (or certain aspects of the embodiments) of the disclosure may be implemented in the form of a computer-readable recording medium that includes computer-executable instructions such as program modules executed by a computer. The computer-readable recording medium may be any available medium which is accessible by a computer, and may include a volatile or nonvolatile medium and a detachable or non-detachable medium. The computer-readable recording medium may also include a computer storage medium. Examples of the computer storage medium include all volatile and nonvolatile media and separable and non-separable media, which have been implemented by an arbitrary method or technology, for storing information such as computer-readable instructions, data structures, program modules, and other data.

Embodiments of the disclosure (or certain aspects of the embodiments) may be implemented with a software (S/W) program including instructions stored in a computer-readable storage medium.

The computer is a device capable of calling out instructions stored in a storage medium and operating under the instructions as in the embodiments of the disclosure, and may include an electronic device according to the embodiments of the disclosure.

The computer-readable storage medium may be provided in the form of a non-transitory storage medium. In this regard, 'non-transitory' refers to the storage medium not including a signal and being tangible, but does not distinguish whether data is stored semi-permanently or temporarily in the storage medium.

Furthermore, the control methods according to embodiments of the disclosure may be included and provided in a computer program product. The computer program product may be traded as a product between a seller and a buyer.

The computer program product may include an S/W program and a computer-readable storage medium in which the S/W program is stored. For example, the computer program product may include an S/W program product (e.g., a downloadable application) electronically distributed by a manufacturing company of the device or an electronic market (e.g., Google Play Store or App Store). For electronic distribution, at least a portion of the S/W program may be stored in a storage medium or temporarily generated. In this case, the storage medium may be a server of the manufacturer, a server of the electronic market, or a storage medium of a relay server that temporarily stores the S/W program.

In a system including a server and a device, the computer program product may include a storage medium of the server or a storage medium of the device. Alternatively, when there is a third apparatus (e.g., a smartphone) connected through communication with the server or the device, the computer program product may include a storage medium of the third apparatus. In an example, the computer program product may include a software program itself that is transmitted from the server to the device or the third apparatus or transmitted from the third apparatus to the device.

In this case, one of the server, the device, and the third apparatus may execute the computer program product to perform the method according to the embodiments of the disclosure. Alternatively, two or more of the server, the device, and the third apparatus may execute the computer program product to perform the method according to the embodiments of the disclosure in a distributed fashion.

For example, the server (e.g., a cloud server or an artificial intelligence server) may execute the computer program product stored therein to control the device connected through communication with the server to perform the method according to the embodiments of the disclosure.

In an example, the third apparatus may execute the computer program product to control the device connected through communication with the third apparatus to perform the method according to the embodiments of the disclosure. When the third apparatus executes the computer program product, the third apparatus may download the computer program product and execute the downloaded computer program product. Alternatively, the third apparatus may execute the computer program product that is preloaded to perform the method according to the embodiments of the disclosure.

In the present specification, the term "... or/er" may refer to a hardware component such as a processor or a circuit, and/or a software component executed by the hardware component such as a processor.

While the embodiments of the disclosure have been particularly shown and described, it will be understood by one of ordinary skill in the art that various changes in form and details may be made therein without departing from the spirit and scope of the disclosure. Therefore, it should be understood that the embodiments of the disclosure described above should be considered in a descriptive sense only and not for purposes of limitation. For example, each component described in a single type may be executed in a distributed manner, and components described distributed may also be executed in an integrated form.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A display apparatus comprising:
a display;
communication circuitry;
memory storing one or more instructions; and
at least one processor, including processing circuitry, configured to, individually or collectively, control the display apparatus to:
receive a voice call request for a voice call,
in response to receiving the voice call request, determine whether audio data is being transmitted from the display apparatus to an audio input/output apparatus by the communication circuitry according to a Bluetooth communication protocol, and
in response to determining that the audio data is being transmitted from the display apparatus to the audio input/output apparatus by the communication circuitry,
identify one or more audio input apparatuses other than the audio input/output apparatus,
select a first audio input apparatus from among the one or more identified audio input apparatuses,
activate the selected first audio input apparatus,
maintain transmission of the audio data to the audio input/output apparatus,
receive speech input for transmitting to a voice call counterpart apparatus via the activated first audio input apparatus through a separate audio input path independent of an audio output path through the audio input/output apparatus, and
receive counterpart speech input from the voice call counterpart apparatus and mix the received counterpart speech input with the audio data being transmitted to the audio input/output apparatus.

2. The display apparatus of claim 1, wherein at least one processor is configured to, individually and/or collectively, control the display apparatus to, in response to determining that the audio data is not being transmitted by the communication circuitry, select the audio input/output apparatus as an audio input apparatus for receiving a speech input for transmitting to the voice call counterpart apparatus.

3. The display apparatus of claim 1, wherein at least one processor is configured to, individually and/or collectively, control the display apparatus to:
obtain an audio input apparatus list in which priorities are assigned to the one or more audio input apparatuses, and
select, as the first audio input apparatus, an audio input apparatus with a highest priority in the audio input apparatus list.

4. The display apparatus of claim 3, wherein at least one processor is configured to, individually and/or collectively, control the display apparatus to determine the priorities, based on an apparatus characteristic of each of the one or more other audio input apparatuses included in the audio input apparatus list.

5. The display apparatus of claim 3, wherein at least one processor is configured to, individually and/or collectively, control the display apparatus to test performance of each of the one or more audio input apparatuses included in the audio input apparatus list, and, based on a result of the test, determine the priorities.

6. The display apparatus of claim 5, wherein at least one processor is configured to, individually and/or collectively, control the display apparatus to periodically test the performance of each of the one or more audio input apparatuses included in the audio input apparatus list, and, based on a result of the test, periodically update the priorities.

7. The display apparatus of claim 3, wherein at least one processor is configured to, individually and/or collectively, control the display apparatus to:
provide a graphical user interface for setting the priorities of the one or more other audio input apparatuses included in the audio input apparatus list, and
determine the priorities, based on input received through the graphical user interface.

8. The display apparatus of claim 1, wherein at least one processor is configured to, individually and/or collectively, control the display apparatus to:
identify one or more other audio input apparatuses registered in the display apparatus,
test performance of each of the one or more identified audio input apparatuses in real time, and
based on a result of the test, select the first audio input apparatus.

9. The display apparatus of claim 1, wherein the one or more other audio input apparatuses include at least one of a display apparatus built-in microphone, a microphone included in an external apparatus connected to the display apparatus, a microphone included in a remote control apparatus configured to control the display apparatus, or a microphone included in a smart device connected to the display apparatus.

10. The display apparatus of claim 1, wherein at least one processor is configured to, individually and/or collectively, control the display apparatus to determine whether the audio data is being transmitted from the display apparatus to the audio input/output apparatus by the communication circuitry by identifying whether the communication circuitry operates according to a Bluetooth advanced audio distribution profile (A2DP) profile.

11. An operating method of a display apparatus, the operating method comprising:

receiving a voice call request for a voice call;

in response to receiving the voice call request, determining whether audio data is being transmitted from the display apparatus to an audio input/output apparatus by communication circuitry according to a Bluetooth communication protocol;

in response to determining that the audio data is being transmitted from the display apparatus to the audio input/output apparatus by the communication circuitry, identifying one or more audio input apparatuses other than the audio input/output apparatus;

selecting a first audio input apparatus from among the one or more identified audio input apparatuses;

activating the selected first audio input apparatus;

maintaining transmission of the audio data to the audio input/output apparatus;

receiving a speech input for transmitting to a voice call counterpart apparatus via the activated first audio input apparatus through a separate audio input path independent of an audio output path through the audio input/output apparatus; and receiving counterpart speech input from the voice call counterpart apparatus and mixing the received counterpart speech input with the audio data being transmitted to the audio input/output apparatus.

12. The operating method of claim 11, comprising, in response to determining that the audio data is not being transmitted by the communication circuitry, selecting the audio input/output apparatus as an audio input apparatus for receiving a speech input for transmitting to the voice call counterpart apparatus.

13. The operating method of claim 12, comprising:

obtaining an audio input apparatus list in which priorities are assigned to the one or more other audio input apparatuses, and selecting, as the first audio input apparatus, an audio input apparatus with a highest priority in the audio input apparatus list.

14. The operating method of claim 13, comprising determining the priorities, based on an apparatus characteristic of each of the one or more other audio input apparatuses included in the audio input apparatus list.

15. A non-transitory computer-readable recording medium having recorded thereon one or more programs which, when executed by at least one processor of a display apparatus, cause the at least one processor to control the display apparatus to:

receive a voice call request for a voice call;

in response to receiving the voice call request, determine whether audio data is being transmitted from the display apparatus to an audio input/output apparatus by communication circuitry according to a Bluetooth communication protocol; and in response to determining that the audio data is being transmitted from the display apparatus to the audio input/output apparatus by the communication circuitry, identify one or more audio input apparatuses other than the audio input/output apparatus;

select a first audio input apparatus from among the one or more identified audio input apparatuses;

activate the selected first audio input apparatus;

maintain transmission of the audio data to the audio input/output apparatus;

receive speech input for transmitting to a voice call counterpart apparatus via the activated first audio input apparatus through a separate audio input path independent of an audio output path through the audio input/output apparatus; and receive counterpart speech input from the voice call counterpart apparatus and mix the received counterpart speech input with the audio data being transmitted to the audio input/output apparatus.

16. The display apparatus of claim 1, wherein the audio data being transmitting from the display apparatus to the audio input/output apparatus by the communication circuitry comprises application audio data generated by an application executed by the display apparatus.

* * * * *